United States Patent
Nakamura et al.

[11] Patent Number: 5,481,163
[45] Date of Patent: Jan. 2, 1996

[54] DISCHARGE LAMP CURRENT CONTROLLING CIRCUIT

[75] Inventors: Kenji Nakamura; Nobuo Ukita, both of Hyogo, Japan

[73] Assignee: Mitsubishi Denki Kabushiki Kaisha, Tokyo, Japan

[21] Appl. No.: 277,487

[22] Filed: Jul. 19, 1994

[30] Foreign Application Priority Data

Aug. 3, 1993 [JP] Japan .................................. 5-192223

[51] Int. Cl.$^6$ .................................................. G05F 1/00
[52] U.S. Cl. .......................... 315/308; 315/307; 315/291; 315/224; 315/128
[58] Field of Search .................... 315/127, 128, 315/224, 291, 77, 82, 307, 308, 209 R, 219, DIG. 2, DIG. 5

[56] References Cited

U.S. PATENT DOCUMENTS

| | | | |
|---|---|---|---|
| 5,140,229 | 8/1992 | Yagi et al. | 315/307 |
| 5,142,203 | 8/1992 | Oda et al. | 315/308 |
| 5,187,413 | 2/1993 | Araki et al. | 315/291 |
| 5,204,587 | 4/1993 | Mortimer et al. | 315/308 |
| 5,233,273 | 8/1993 | Waki et al. | 315/224 |
| 5,256,940 | 10/1993 | Wada et al. | 315/248 |
| 5,365,152 | 11/1994 | Ozawa et al. | 315/308 X |

FOREIGN PATENT DOCUMENTS 4-141988  5/1992  Japan .

OTHER PUBLICATIONS

Vedilis "Eureka Project 273" Field Test Specifications (no date needed, see paper #10 for a related statement).
Vedilis "Eureka Project 273" Vehicle Discharge Light System (no date needed, see paper #10 for a related statement).

Primary Examiner—Robert J. Pascal
Assistant Examiner—Haissa Philogene
Attorney, Agent, or Firm—Birch, Stewart, Kolasch & Birch

[57] ABSTRACT

A discharge-lamp lighting device stably lights and controls a discharge lamp suitable for use in a vehicle. In the discharge-lamp lighting device, an inverter for receiving DC power from a DC step-up circuit supplies AC power to the discharge lamp. Further, a start-discharging circuit applies a high voltage for effecting start discharging to the discharge lamp. A lamp current controlling circuit decides the value of a current to be supplied to the discharge lamp, based on both the luminous efficiency of the discharge lamp, which varies depending on a voltage applied to the discharge lamp and a voltage for the discharge lamp, which has been detected by a voltage detector circuit. A step-up controlling circuit controls a voltage output from the DC step-up circuit in such a manner that the decided value of current coincides with the value of a current to be supplied to the discharge lamp, which has been detected by a current detector circuit.

34 Claims, 23 Drawing Sheets

1

DISCHARGE LAMP CURRENT CONTROLLING CIRCUIT

BACKGROUND OF THE INVENTION

1. Field of the Invention

The present invention relates to a discharge-lamp lighting device for lighting and controlling a discharge lamp such as a metal halide lamp.

2. Description of the Related Art

Modern vehicles require increases in safety, adaptability to the environment and individuality. A vehicle headlight now needs to have an increase in the quantity of light, a reduction in size an improvement in running safety and a rise in design need. Conventional lamps used for the vehicle already encounter difficulties in meeting such a demand. Therefore, the adoption of a discharge lamp as a new light source to be mounted on the vehicle has been discussed.

FIG. 1 is a schematic view showing the structure of a 35 W type metal halide lamp corresponding to one kind of a conventional discharge lamp. The metal halide lamp 12 has a structure in which a silica tube 121 is sealed at its both ends and a luminescent or light-emitting tube 122 is situated in its center.

Reference numerals 123a and 123b indicate tungsten electrodes provided in the luminescent tube 122 and are electrically connected to external leads 125a and 125b respectively through molybdenum foils 124a and 124b respectively. The luminescent tube 122 has been charged, at its inside, with metal halogenides 126 produced by combining several kinds of metals such as sodium, scandium, etc. with iodine, a starter gas (such as xenon gas) 127 and mercury 128.

Such a discharge lamp is much different from the conventional light bulb in that the discharge lamp utilizes an arc created between electrodes as an illuminant wherein it is necessary to provide a lighting device for controlling the arc as compared with the conventional light bulb whose single filament is simply supplied with a voltage to emit light.

A description will now be made of a role to be performed by the lighting device through the manner of emitting light from the discharge lamp. The discharge lamp 12 first needs a high initial starting voltage of from several kV to ten and several kV. The lighting device generates the high voltage and applies it between the tungsten electrodes 123a and 123b of the discharge lamp.

Thus, an electric discharge is started between the tungsten electrodes 123a and 123b of the discharge lamp, so that a current flows between the tungsten electrodes 123a and 123b. Thereafter, the lighting device supplies the maximum rated power or current of the discharge lamp 12 to the discharge lamp 12 to thereby increase the quantity of light emitted by or from the discharge lamp 12 as soon as possible.

At this time, the current, which has flowed in the discharge lamp 12, activates the starter gas 127 charged into the luminescent tube 122 to thereby start an arc discharge based on the starter gas 127.

At this time, the voltage applied to the discharge lamp 12 rises from about 20 V. Further, the lighting device adjusts power to be input or supplied to the discharge lamp 12 to gradually decrease the power in accordance with this voltage to thereby control or adjust the quantity of light emitted from the discharge lamp 12 in an overload state.

When the power to be supplied to the discharge lamp 12 is controlled, the temperature at the inside of the discharge lamp 12 rapidly rises to evaporate the mercury 128, with the result that an arc discharge based on mercury gas is then started. Since the temperature at the center of the mercury arc reaches about 4500K (Kelvin) and the inside of the luminescent tube 122 is brought to a higher temperature and a higher pressure, the metal halogenides 126 start evaporating and are separated into a metal ion and a halogen ion within the arc. As a result, the metal ion emits light at a spectrum peculiar to the metal.

After the vaporization of substantially all the metal halogenides 126, arc light reaches a final form and output and the voltage of the discharge lamp 12 is saturated so as to reach a stable voltage (hereinafter called a "stationary lamp voltage"). At this time, the lighting device fixes the power to be supplied to the discharge lamp 12 to the rated power to thereby emit stable light free of any flicker from the discharge lamp 12.

It is thus necessary for the lighting device to actively control the power to be supplied to the discharge lamp 12 based on the lamp voltage in order to cause light to rapidly rise and stabilize. A method of effecting such power control has been described in a standard of EUREKA PROJECT 273 VEDILIS (hereinafter called simply "VEDILIS") shown in FIG. 2 as one example.

FIG. 2 shows a lamp current control characteristic indicative of lamp current (i.e., power) flowing into a discharge lamp vs. desired lamp voltages applied to the discharge lamp. According to the lamp current control characteristic based on the VEDILIS, lighting rise control is effected within a range in which the maximum rated power and the maximum rated current of the discharge lamp are satisfied, and the discharge lamp is finally lighted and controlled at the rated power.

First of all, a current less than or equal to the maximum rated current is caused to flow in the discharge lamp in the lamp-voltage range of 0 V to a voltage of 28.8 V determined from the maximum rated power/maximum rated current of the discharge lamp. During this period, a linear characteristic appears on the lamp current control characteristic. A current, which provides the maximum rated power with respect to the lamp voltage, is allowed to flow in the discharge lamp in the lamp-voltage range of 28.8 V to a desired voltage (40 V in this example). During this period, a curve characteristic appears on the same lamp current control characteristic.

Next, a linear characteristic appears in the lamp-voltage range of 40 V to the minimum rated voltage 65 V of the discharge lamp. When the lamp-voltage range exceeds such a lamp-voltage range, a lamp current, which lights the discharge lamp at the upper limit of the rated power of 38 W with respect to the lamp voltage, is allowed to flow in the discharge lamp. During this period, a curve characteristic appears on the same lamp current control characteristic.

To sum up, the linear characteristic, the curve characteristic, the linear characteristic and the curve characteristic appear on the lamp current control characteristic based on the VEDILIS in this way until the lamp voltage is saturated and stabilized.

FIG. 3 shows a lamp current control characteristic obtained by a lighting device which has been disclosed in Japanese Patent Application Laid-Open Publication No. 4-141988. The lighting device effects power control along a straight line gc and a straight line gb placed at an angle of h during a period (transition region Ab) in which a region changes from a light-emission exciting region Aa at which the maximum rated current is caused to flow in a discharge lamp in accordance with a lamp current control characteristic indicated by a straight line ga to a constant power region B at which constant power control is effected in accordance with a lamp current control characteristic indicated by the straight line gc. The lighting device effects power rate-of-change reducing control along a curve h which is smooth in the vicinity of a point at which the straight line ga and the straight line gb intersect. Symbol PQ in FIG. 3 indicates a constant power curve.

When the conventional discharge-lamp lighting device is constructed as described above, the luminous efficiency of the discharge lamp at a desired lamp voltage which varies due to variations in its manufacture and its secular change, has not been taken into consideration. Further, only control based on a fixed lamp current control characteristic can be effected. In almost all cases, because the fixed lamp current control characteristic is directed toward its minimum rated voltage, there is developed a power shortage in the vicinity of a point where the lamp voltage reaches a stationary lamp voltage. As a result, a large undershoot occurs in light output produced from the discharge lamp.

SUMMARY OF THE INVENTION

This invention has been made to solve the above problems. It is therefore an object of the present invention to provide a device for lighting a discharge lamp, which is capable of rapidly increasing the quantity of light emitted from the discharge lamp up to the rated quantity of light and stabilizing the quantity of light.

It is another object of the present invention to provide a device for lighting a discharge lamp, which is capable of absorbing a difference in luminous efficiency between variations in the discharge lamp.

It is a further object of the present invention to provide a device for lighting a discharge lamp, which is capable of preventing the discharge lamp from lighting up at excessive power when the discharge lamp is lighted.

It is a still further object of the present invention to provide a device for lighting a discharge lamp, which is capable of preventing the discharge lamp from lighting up at excessive power when it is in a stationary state.

It is a still further object of the present invention to provide a device for lighting a discharge lamp, which is capable of properly storing a stationary lamp voltage therein.

It is a still further object of the present invention to provide a device for lighting a discharge lamp, which is capable of realizing a lamp current control characteristic with a simple method, being constructed by a simple circuit and abruptly increasing a lamp voltage after the discharge lamp has started lighting and thereafter slowly increasing the lamp voltage to thereby saturate and stabilize the lamp voltage.

It is a still further object of the present invention to provide a device for lighting a discharge lamp, which is capable of supplying the maximum power to the discharge lamp at the initial stage of its lighting and providing a faster rise in the quantity of light.

It is a still further object of the present invention to provide a device for lighting a discharge lamp, which is capable of restraining an undershoot of a light level.

In a device for lighting a discharge lamp, according to a first aspect of this invention, a lamp current controlling means decides power or current to be supplied to a discharge lamp using a preset lamp current control characteristic, based on the luminous efficiency of the discharge lamp, which varies depending on a variation in lamp voltage.

The lighting device determines a lamp voltage and power to be supplied to the discharge lamp from the relationship between the lamp voltage and the luminous efficiency and fixes the relationship between a lamp voltage and a lamp current as a lamp current control characteristic, thereby making it possible to cause the quantity of light emitted from the discharge lamp to rapidly rise to a stable quality of light from the beginning of its lighting.

In a device for lighting a discharge lamp, according to a second aspect of this invention, a lamp current controlling means has a stationary lamp voltage storing means and a plurality of lamp current control characteristics and selects the optimum lamp current control characteristic from the plurality of lamp current control characteristics depending on a stationary lamp voltage of the discharge lamp.

The lighting device selects the lamp current control characteristic suitable for the discharge lamp from the plurality of lamp current control characteristics depending on the stationary lamp voltage to thereby make it possible to cope with a variation in luminous efficiency, which occurs due to variations produced upon manufacturing of the discharge lamp and a secular change in discharge lamp and to provide a stable quantity of light at all times even when any discharge lamp is lighted.

In a device for lighting a discharge lamp, according to a third aspect of this invention, when a discharge lamp unknown in characteristic is lighted, a lamp current controlling means controls lamp current so as to cause a current flow in the discharge lamp in accordance with a lamp current control characteristic indicative of the minimum power to be supplied to the discharge lamp, of a plurality of lamp current control characteristics.

When the discharge lamp unknown in characteristic is lighted, the lighting device selects the lamp current control characteristic indicative of the lowest supply power with respect to a desired lamp voltage from the plurality of lamp current control characteristics to thereby prevent the discharge lamp from lighting up at excessive power when the discharge lamp lights up in a steady state.

In a device for lighting a discharge lamp, according to a fourth aspect of this invention, a lamp current controlling means selects a lamp current control characteristic in which the power to be supplied is lowered, as an alternative to the present lamp current control characteristic being selected from a plurality of lamp current control characteristics when a lamp voltage drops.

When the lamp voltage is lowered due to causes such as a variation in environment, a malfunction of the discharge lamp, etc., the lighting device changes the lamp current control characteristic now in use to the lamp current control characteristic in which the power to be supplied is lowered, to thereby prevent the discharge lamp from being lighted at excessive power.

In a device for lighting a discharge lamp, according to a fifth aspect of this invention, a stationary lamp voltage storing means holds the stored contents constant for a predetermined time even if a stationary lamp voltage is less than or equal to the voltage stored therein.

Even if the stationary lamp voltage of the discharge lamp when in a lighted state is less than or equal to the voltage stored in the stationary lamp voltage storing means, the lighting device holds the stored contents constant for the predetermined time to thereby make it possible to prevent the stationary lamp voltage from being erroneously stored due to a transitory variation such as noise. Thus, the lighting device can realize a rise in the optimum quantity of light or light level even upon effecting the next lighting of the discharge lamp.

In a device for lighting a discharge lamp, according to a sixth aspect of this invention, a plurality of lamp current control characteristics respectively fall within a range less than or equal to the maximum rated power, the maximum rated current and the maximum rated voltage of the discharge lamp and are represented in the form of a single bent line in which respective intersection points of at least four approximate straight lines, which exist on lamp-voltage vs lamp-current coordinates, serve as vertexes.

The first approximate straight line is of a straight line obtained by connecting a first coordinate point (0, maximum rated current of discharge lamp) and a second coordinate point (maximum rated power of discharge lamp/maximum rated current thereof, maximum rated current thereof) to each other. The second approximate straight line is of a tangential line of a maximum rated power curve drawn by the maximum rated power of the discharge lamp, which passes through the second coordinate point. The third approximate straight line is of a straight line which intersects a rated power curve drawn by the rated power of the discharge lamp at two coordinate points within a range between the minimum rated voltage of the discharge lamp and the maximum rated voltage thereof. The fourth approximate straight line is of a straight line which passes through a third coordinate point indicative of a stationary lamp voltage on the third approximate straight line and which is drawn toward the second approximate straight line.

The lighting device controls the discharge lamp in accordance with the first through fourth approximate straight lines to thereby abruptly increase a lamp voltage after the beginning of lighting of the discharge lamp and thereafter slowly increase the lamp voltage. That is, the discharge lamp can be saturated and stabilized in accordance with a simple method.

In a device for lighting a discharge lamp, according to a seventh aspect of this invention, a fourth approximate straight line is a tangential line of a maximum rated power curve of a discharge lamp, which extends in the direction of a voltage lower than a stationary lamp voltage.

The lighting device controls the discharge lamp in accordance with a characteristic existing on the voltage side lower than the stationary lamp voltage to thereby enable the fourth approximate straight line to supply the maximum power to the discharge lamp at the beginning of its lighting and to make it possible to make a rise in the quantity of light emitted from the discharge lamp faster.

In a device for lighting a discharge lamp, according to an eighth aspect of this invention, a lamp current controlling means has an undershoot restraining or controlling means for reducing an undershoot developed in a quantity-of-light rise characteristic of a discharge lamp. Further, the lamp current controlling means varies a control operating point on a lamp current control characteristic depending on a variation in lamp voltage and equivalently changes the lamp current control characteristic using the undershoot restraining means.

The lighting device varies the control operating point on the lamp current control characteristic depending on the variation in lamp voltage to thereby restrain the undershoot and reduce a difference in light level between an overshoot and the undershoot. As a result, the lighting device can realize a rise in the quantity of light, which is free of a feeling of physical disorder caused by large swings in the light level output.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

First embodiment

Figure 1:
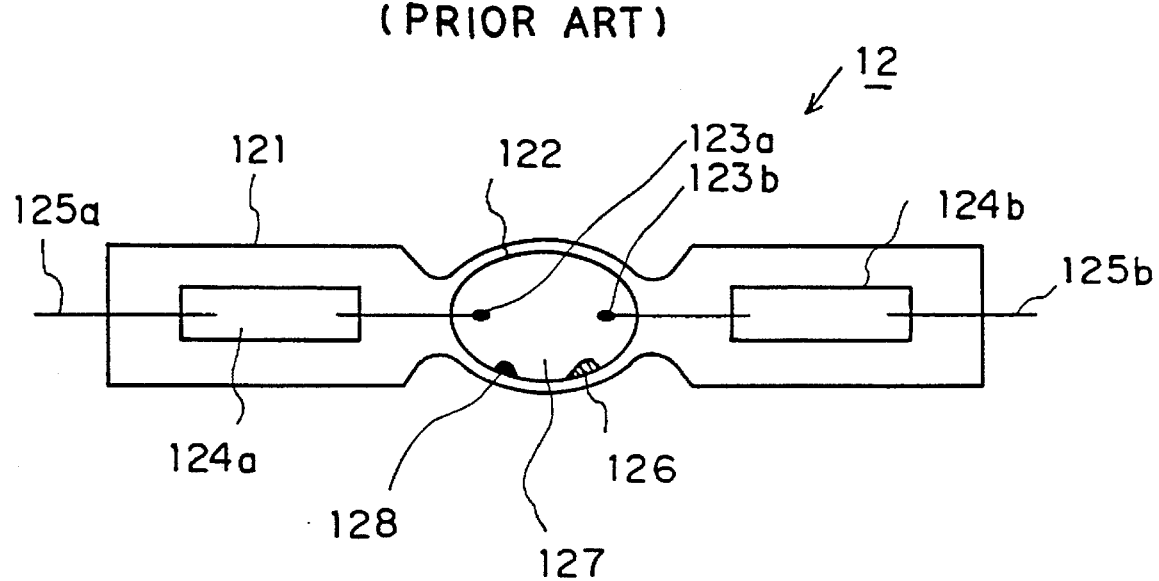
FIG. 1 is a view schematically showing the structure of a conventional discharge lamp.
Figure 2:
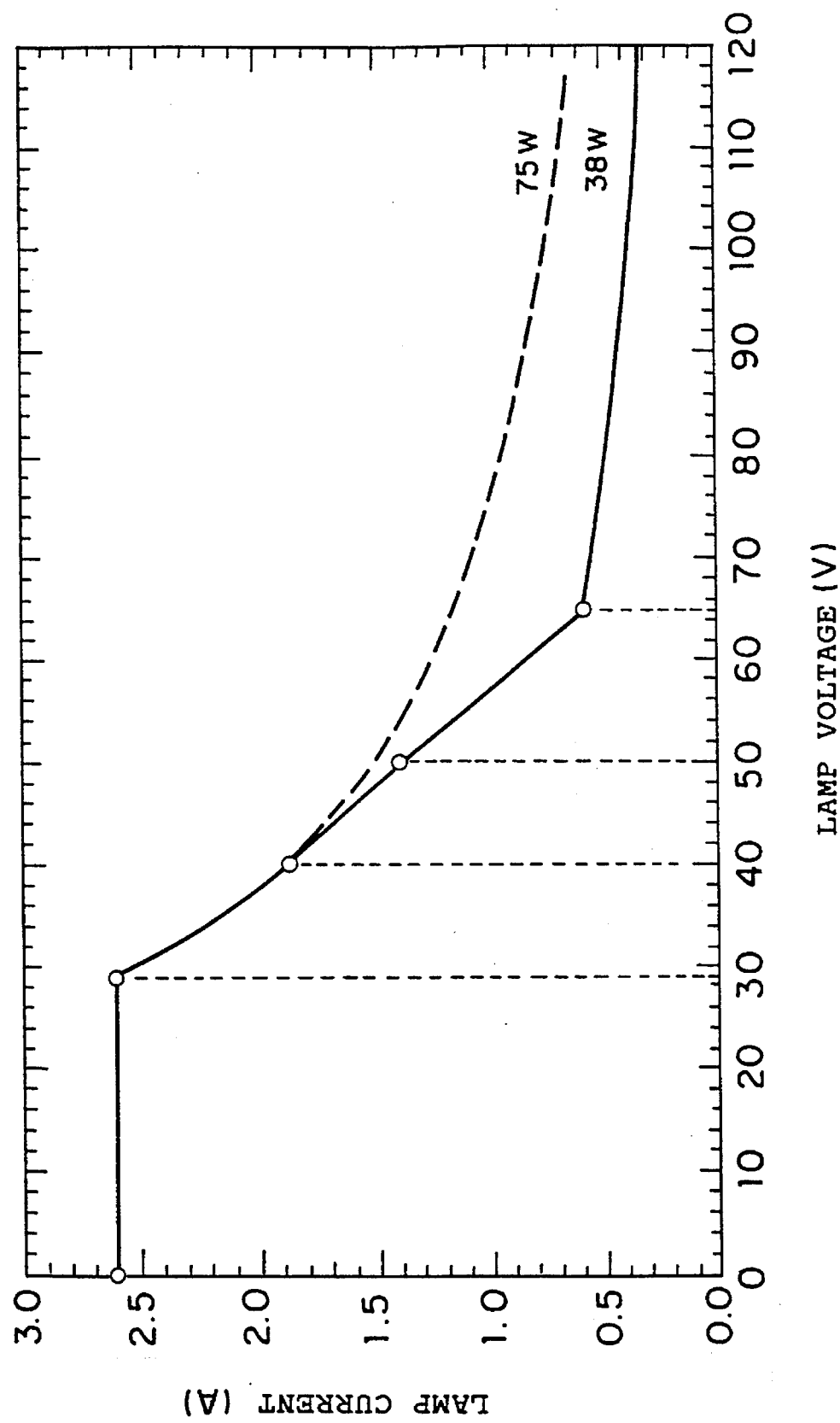
FIG. 2 is a view for describing a control standard of the conventional discharge lamp shown in FIG. 1.
Figure 3:
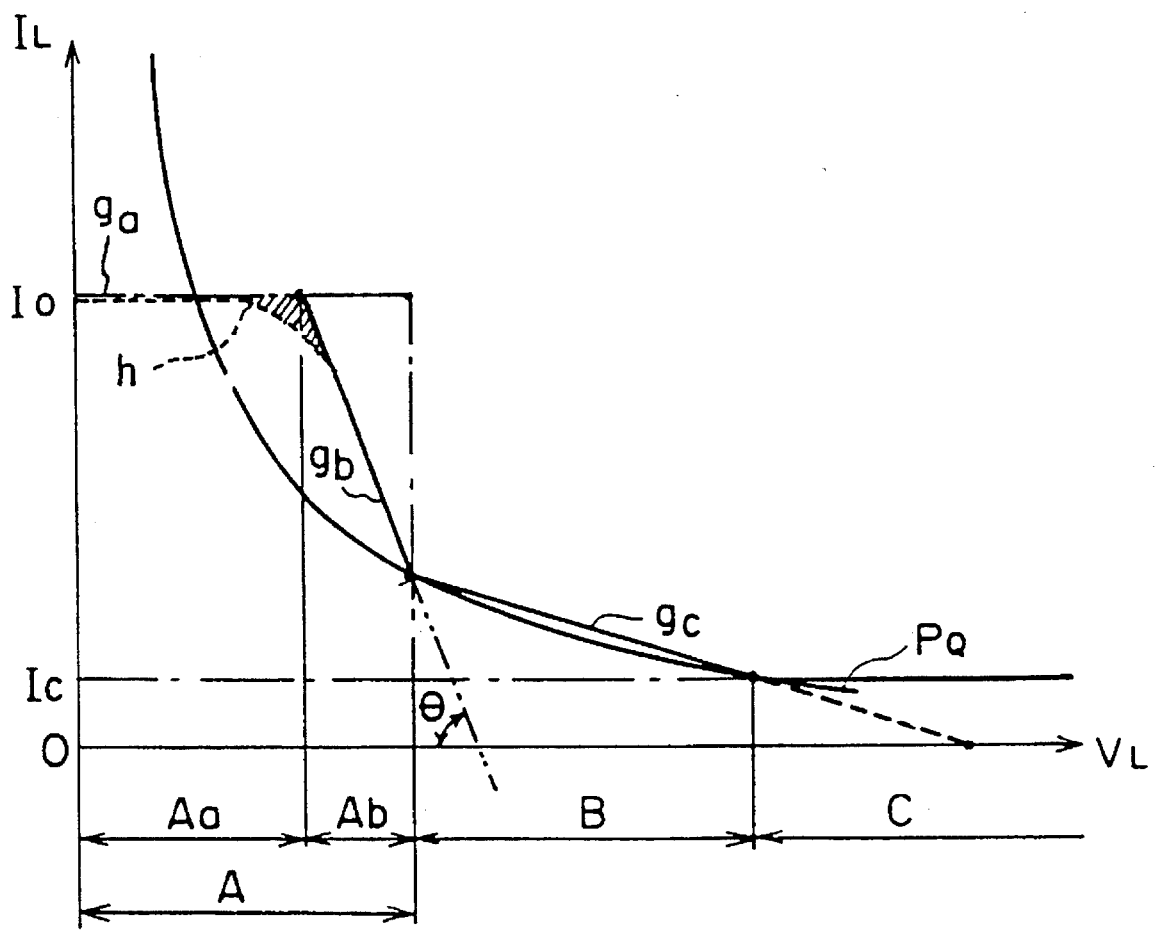
FIG. 3 is a view for describing a lamp current control characteristic based on the control standard shown in FIG. 2.
Figure 4:
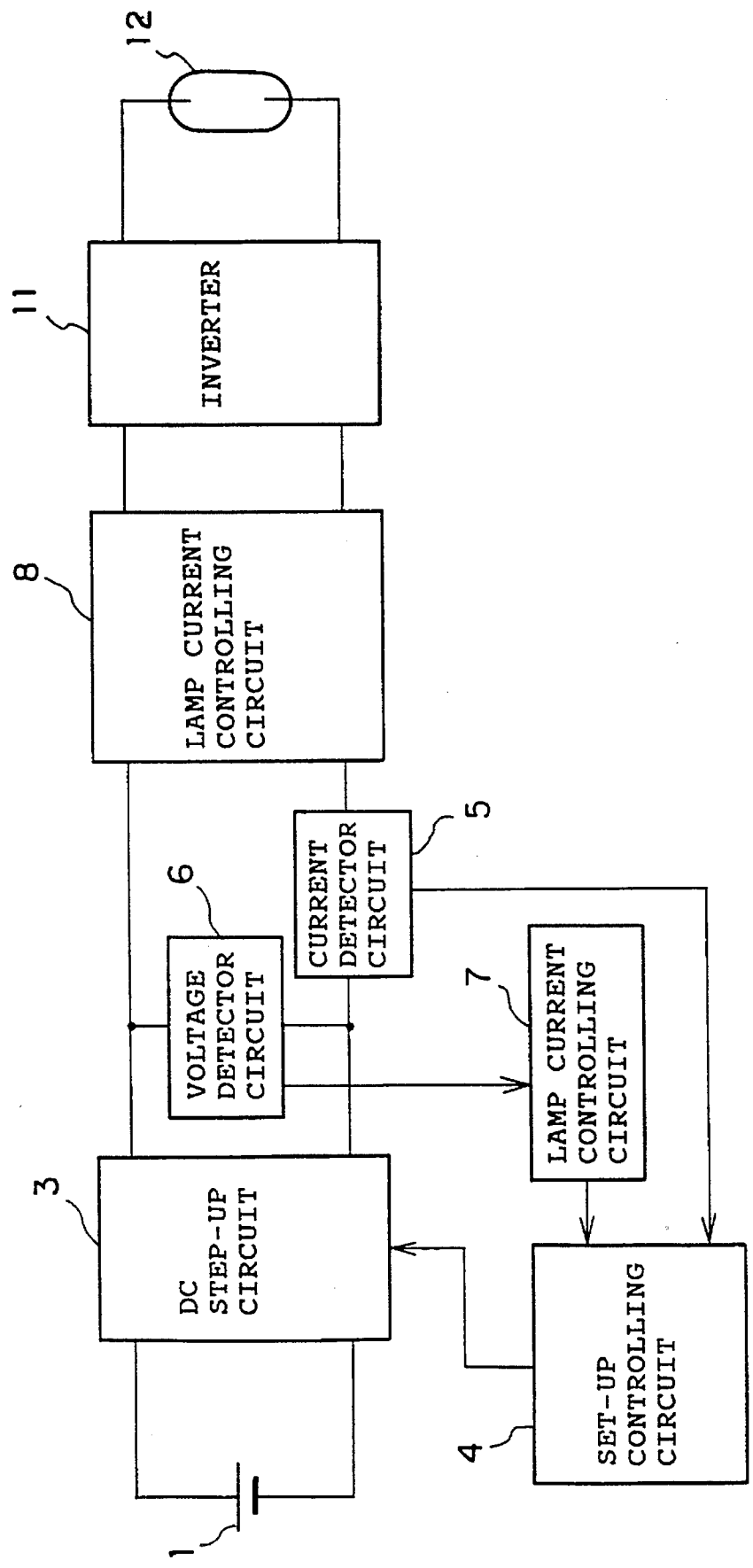
FIG. 4 is a block diagram schematically showing the structure of a device for lighting a discharge lamp, according to the present invention.
Figure 5:
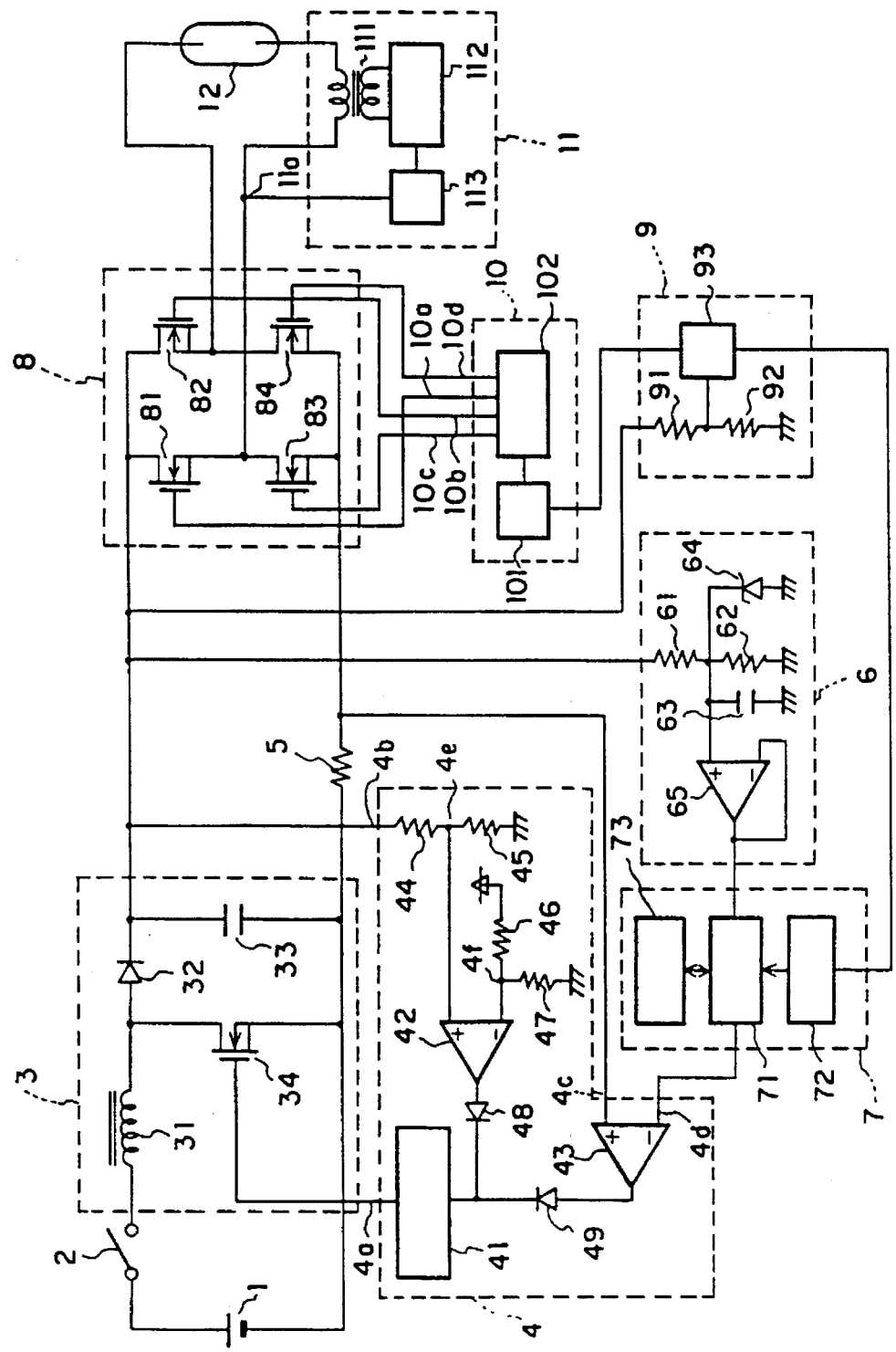
FIG. 5 is a circuit diagram illustrating a circuit configuration of a device for lighting a discharge lamp, according to a first embodiment of the present invention.

The first embodiment of the present invention will hereinafter be described with reference to the accompanying drawings. In FIGS. 4 and 5, reference numerals 1, 2 and 3 respectively indicate a d.c. power, a lighting switch and a d.c. step-up circuit (hereinafter called a "DC step-up circuit") having a step-up type chopper arrangement, which is made up of a coil 31, a diode 32, a capacitor 33 and a switching device or element 34.

The d.c. power 1 is electrically connected to one of terminals of the coil 31, which corresponds to an input terminal of the DC step-up circuit 3, through the lighting switch 2. A drain terminal of the switching element 34 and an anode terminal of the diode 32 are electrically connected to the other terminal of the coil 31.

A cathode terminal of the diode 32 is electrically connected to one of terminals of the capacitor 33, which corresponds to the output of the DC step-up circuit 3. The other terminal of the capacitor 33 is electrically connected to a source terminal of the switching device 34 and the ground (hereinafter called "GND") of the d.c. power 1.

Designated at numeral 4 is a step-up controlling circuit having an output terminal 4a and four input terminals 4b through 4d. The output terminal 4a is electrically coupled to a gate terminal of the switching element 34 of the DC step-up circuit 3, whereas the input terminal 4b is electrically connected to the output of the DC step-up circuit 3.

Further, the input terminal 4c is electrically connected to the output of a current detector circuit 5 electrically coupled to the GND. The input terminal 4d is electrically connected to the output of a lamp current controlling circuit 7. The step-up controlling circuit 4 comprises a pulse-width modulation (hereinafter called "PWM") controller 41, error amplifiers 42, 43 and resistors 44 through 47.

The resistors 44 and 45 are electrically series-connected between the input terminal 4b of the step-up controlling circuit 4 and the GND. A junction point or node 4e between the resistors 44 and 45 is electrically connected to a non-inversion input terminal of the error amplifier 42. Further, the resistors 46 and 47 are electrically series-connected between a reference voltage (e.g., 5 V) and the GND. A node 4f between the resistors 46 and 47 is electrically connected to an inversion input terminal of the error amplifier 42.

A non-inversion input terminal of the error amplifier 43 is electrically connected to the input terminal 4c of the step-up controlling circuit 4, whereas an inversion input terminal thereof is electrically coupled to the input terminal 4d of the step-up controlling circuit 4. The outputs of these error amplifiers 42 and 43 are wired-OR connected to each other through diodes 48 and 49 so as to be input to the PWM controller 41.

When the level of an output produced from either the error amplifier 42 or the error amplifier 43 is low, the PWM controller 41 makes an on-duty of a signal output to the switching device 34 wider so as to increase the degree of step-up of the DC step-up circuit 3. On the other hand, when the output level of either the error amplifier 42 or the error amplifier 43 is high, the PWM controller 41 makes the on-duty of the switching device 34 narrow so as to decrease the degree of step-up of the DC set-up circuit 3.

Since the error amplifiers 42 and 43 are wired-OR connected to the PWM controller 41 as described above, either one of their high output levels is given priority and input to the PWM controller 41.

The current detector circuit 5 is realized by using, for example, a resistor whose one terminal is electrically connected to the GND and other terminal is electrically connected to the input terminal 4c of the set-up controlling circuit 4.

Designated at numeral 6 is a voltage detector circuit which comprises resistors 61 and 62, a capacitor 63, a zener diode 64 and an operational amplifier (hereinafter called an "OP amp") 65. One of the terminals of the resistor 61 serves as an input terminal of the voltage detector circuit 6 and is electrically connected to the output terminal of the DC step-up circuit 3. On the other hand, the other terminal of the resistor 61 is electrically coupled to the GND through the resistor 62. Further, the other terminal of the resistor 61 is electrically connected to one of the terminals of the capacitor 63, the cathode of the zener diode 64 and a non-inversion input terminal of the OP amp 65.

The other terminal of the capacitor 63 and the zener diode 64 are both electrically connected to the GND. The zener diode 64 is inserted into the voltage detector circuit 6 to mainly protect the non-inversion input terminal of the OP amp 65 from being supplied with an excessive voltage. An inversion input terminal of the OP amp 65 is electrically connected to the output of the OP amp 65, which serves as the output of the voltage detector circuit 6.

The lamp current controlling circuit 7 has a processing means 71, a timer circuit 72 and an indicating current table 73. The processing means 71 is made up of a microcomputer having an A/D converter and a D/A converter incorporated therein. The indicating current table 73 is comprised of a memory such as a ROM or the like.

The lamp current controlling circuit 7 is used to indicate power, i.e., current supplied to a discharge lamp 12 based on an input applied thereto from the voltage detector circuit 6. The lamp current controlling circuit 7 outputs a signal descriptive of the indicated current to the input terminal 4d of the step-up controlling circuit 4.

Now, the value of the indicated current, which is the value of the voltage output from the lamp current controlling circuit 7, is equal to the value of current indicated by a voltage developed across the current detector circuit 5 and input to the input terminal 4c of the step-up controlling circuit 4. If a current at the time that a voltage developed in the current detector circuit 6 is 1 V is 1 A, for example, then the voltage output from and the current indicated by the lamp current controlling circuit 7 means is 1 V and 1 A respectively.

Designated at numeral 8 is an inverter having a full-bridge arrangement, which comprises switching devices or elements 81 through 84. Drain terminals of the switching devices 81 and 82 are electrically connected to the output terminal of the DC step-up circuit 3. Further, source terminals of the switching devices 81 and 82 are electrically connected to drain terminals of the switching devices 83 and 84 respectively.

A start-discharge detector circuit 9 is constructed in such a manner that resistors 91 and 92 are electrically series-connected between the output terminal of the DC step-up circuit 3 and the GND and a voltage divided by the resistors 91 and 92 is input to a comparator 93. The comparator 93 detects a leading edge of the divided voltage and decides from the result of detection that a starting discharge has been successfully carried out. Thereafter, the comparator 93 sends a signal to the timer circuit 101 and the lamp current controlling circuit 7.

Reference numeral 10 indicates a driver which has output terminals 10a through 10d respectively electrically connected to the gates of the respective switching devices 81 through 84 in order to turn on and off the switching devices 81 through 84 of the inverter 8.

The driver 10 has the timer circuit 101 and a driver circuit 102. The driver circuit 102 outputs signals, each having a so-called dead time, to their corresponding terminals 10a through 10d during a period in which the switching devices 81 and 84 are equal in phase to each other at the same frequency, the switching devices 82 and 83 are identical in phase to each other at the same frequency, the switching devices 81 and 82 are activated in an opposite-phase relationship at the same frequency, and the switching devices 81 and 84 and the switching devices 82 and 83 are not turned on simultaneously.

The timer circuit 101 counts a time interval which has elapsed since the input of the signal from the comparator 93.

Designated at numeral 11 is a start-discharging circuit comprising a transformer 111, a high-voltage generating circuit 112 and a time-constant circuit 113. Terminals on the primary side of the transformer 111 of the start-discharging circuit 11 are electrically connected to the high-voltage generating circuit 112. One of terminals on the secondary side of the transformer 111 is electrically connected to the source terminal of the switching device 81 of the inverter 8 and connected to the high-voltage generating circuit 112 through the time-constant circuit 113.

The other terminal on the secondary side of the transformer 111 is electrically connected to one of terminals of the discharge lamp 12. The other terminal of the discharge lamp 12 is electrically connected to the source terminal of the switching device 82 of the inverter 8.

Operation of the first embodiment will be described below. When the lighting switch 2 is turned on, the step-up controlling circuit 4 starts operating in response to a voltage supplied from the DC power 1 so as to turn on and off the switching device 34 of the DC step-up circuit 3, thereby increasing the voltage of the DC power 1.

During an on-period of the switching device 34, a loop is formed by the DC power 1, the switching device 34 and the coil 31. Electromagnetic energy is stored in the coil 31 based on current which flows into the coil 31 from the DC power 1 through this loop.

During an off-period of the switching device 34, a loop is next formed by the DC power 1, the lighting switch 2, the coil 31, the diode 32 and the capacitor 33. The electromagnetic energy stored in the coil 31 during the on-period of the switching device 34 is supplied via the diode 32 to the capacitor 33, where it is converted into electrostatic energy and stored therein. Thus, a voltage corresponding to the electrostatic energy is multiplied by the voltage of the DC power 1 and the multiplied voltage appears across the capacitor 33.

The voltage developed across the capacitor 33, i.e., the output of the DC step-up circuit 3 is gradually raised by repeatedly on-off controlling the switching device 34 at a frequency f while the on- and off-duties are being changed.

Here, the output of the DC step-up circuit 3 will be represented as Va. The on- and off-duties of the switching device 34 vary depending on inputs supplied through the input terminals 4b, 4c and 4d of the step-up controlling circuit 4.

The error amplifier 42 in the step-up controlling circuit 4 amplifies a difference between a fixed voltage Vf (inverted input) at the node 4f, which is obtained by dividing the reference voltage with the resistors 46 and 47 and a voltage Ve (non-inverted input) at the node 4e, which is obtained by dividing the output Va of the DC step-up circuit 3 with the resistors 44 and 45. Now, the fixed voltage Vf is set equal to the voltage Ve at the node 4e, which reaches Va=400 V (first predetermined value), for example.

Figure 6:
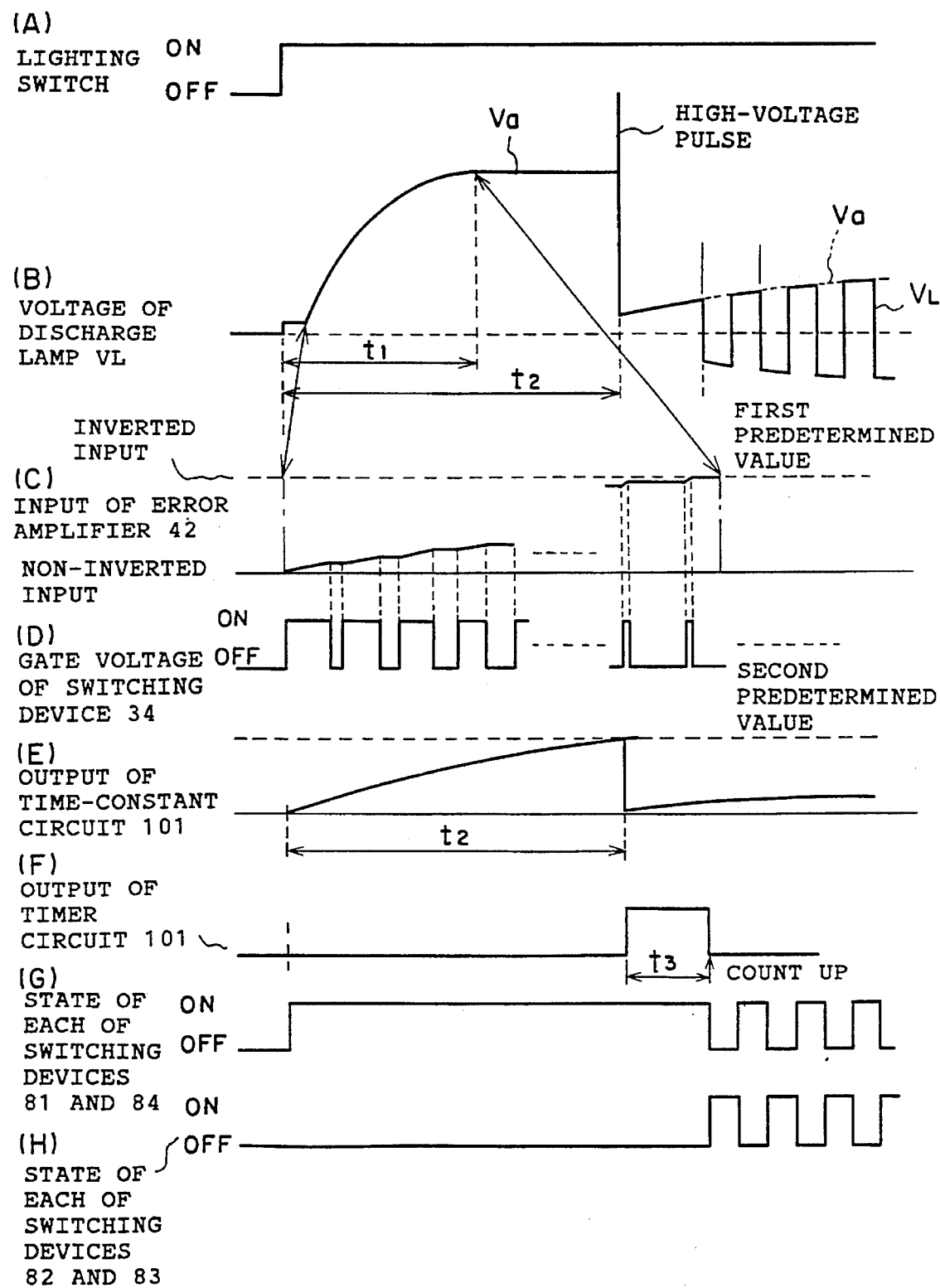
FIG. 6 is a timing chart for describing waveforms of signals which appear at respective portions of the lighting device shown in FIG. 5.

When the lighting switch 2 is turned on, the output Va of the DC step-up circuit 3 is lower than the first predetermined value and the output of the error amplifier 42 is brought to a low level. Therefore, the PWM controller 41 makes an on-duty of a gate signal output supplied to the switching device 34 wide. Thus, the degree of step-up of the output Va of the DC step-up circuit 3 is raised. As the output Va increases and approaches the first predetermined value, the PWM controller 41 makes its on-duty narrow so as to reduce the degree of step-up of the output Va. The PWM controller 41 is activated so as to hold the voltage at the time of Vf=Ve when the voltage Ve has reached the first predetermined value (see FIG. 6(D)).

Now, consider that a time interval required to cause the voltage Ve to reach the first predetermined value since the turning on of the lighting switch 2 is t1. Since, at this time, the current does not flow in the current detector circuit 5 (a voltage Vc at the input terminal 4c is equal to 0), the output of the error amplifier 43 is low in level as compared with the output of the error amplifier 42 (see FIG. 6(C)). Accordingly, the output of the error amplifier 42 is not a part of the step-up operation at this time.

In parallel with this a step-up operation, the driver circuit 102 continues to turn on the switching devices 81 and 84 of the inverter 8 and to turn off the switching devices 82 and 83 contrary to this on-operation. Accordingly, the output Va (DC voltage) of the DC step-up circuit 3 is applied across the discharge lamp 12 as it is (see FIGS. 6(A) and 6(B)).

The output Va of the DC step-up circuit 3 is supplied to the time-constant circuit 113 of the start-discharging circuit 11 through a junction point or node 11a. When the output of the time-constant circuit 113 reaches a second predetermined value, the high-voltage generating circuit 112 outputs an impulse voltage to the transformer 111. As a result, a high-voltage pulse is applied to the discharge lamp 12 so as to start discharging.

Incidentally, the relationship between a time interval t2 required to cause the output of the time-constant circuit 113 to reach the second predetermined value and the time interval t1 required to cause the output Va of the DC step-up circuit 3 to reach the first predetermined value is represented as $t2 \geq t1$.

When the current flows in the discharge lamp 12 so that the start discharging is effected, the load (impedance of the discharge lamp 12) of the DC step-up circuit 3 changes from a non-load state to a heavy-load state. Therefore, the output Va of the DC step-up circuit 3 is abruptly reduced (see FIG. 6(B)).

The start-discharge detector circuit 9 detects such an abrupt voltage drop and informs the result of detection of the timer circuit 101 and the current controlling circuit 7. The timer circuit 101 counts a predetermined time interval t3 (see FIG. 6(F)). When the timer circuit 101 counts the predetermined time interval t3, the driver circuit 102 sends a signal having a dead time of approximately several μ seconds to each of the switching devices 81 and 84 at a frequency f2 (e.g., 400 Hz) and a duty of 50% (see FIG. 6(G)). Further, the driver circuit 102 sends a signal which is out of phase with the former signal to each of the switching devices 82 and 83 (see FIG. 6(H)). The switching devices 81 and 84 and the switching devices 82 and 83 are alternately turned on and off.

Although the discharge lamp 12 has an on-loss produced by the switching devices 81 through 84, the discharge lamp 12 is supplied with a rectangular-waveform type ac voltage whose zero peak is substantially Va. Accordingly, the voltage Va is substantially equal to a lamp voltage VL of the discharge voltage 12 (VL≈Va).

The voltage detector circuit 6 supplies the lamp voltage VL obtained by dividing the voltage input thereto with the resistors 61 and 62 to the lamp current controlling circuit 7 through the OP amp (buffer) 65. The capacitor 63 is provided so as to absorb an output ripple of the DC step-up circuit 3, which is superimposed on the lamp voltage VL.

The lamp current controlling circuit 7 is provided with a current indicating table 73 having a lamp current control characteristic recorded thereon for causing the discharge lamp 12 to quickly and stably rise to the rated quantity of light. The processing means 71 reads an indicated lamp current ILS from the current indicating table 73 in response to the value of the input lamp voltage VL and outputs a voltage corresponding to the indicated signal to the inversion input terminal of the error amplifier 43.

On the other hand, a lamp current IL, which actually flows in the discharge lamp 12, is converted into its corresponding voltage by the current detector circuit 5 so as to be input to the non-inversion input terminal of the error amplifier 43. Accordingly, the error amplifier 43 outputs a voltage corresponding to the difference between the indicated lamp current ILS and the lamp current IL.

Since, at this time, the output of the error amplifier 43 becomes larger than that of the error amplifier 42, the on-duty of the switching device 34 is controlled by the PWM controller 41 in accordance with the output of the error amplifier 43 after the output of the error amplifier 43 has become larger than that of the error amplifier 42 (after the start discharge has been made).

When the output of the current detector circuit 5 is larger than that of the lamp current controlling circuit 7 (or when the actually-flowing lamp current IL is larger than the lamp current ILS), the error amplifier 43 produces a signal high in level. As a result, the PWM controller 41 makes the on-duty of the switching device 34 narrower to reduce a voltage output from the DC step-up circuit 3, thereby decreasing the current that flows in the discharge lamp 12.

On the other hand, when the output of the current detector circuit 5 is smaller than that of the lamp current controlling circuit 7 (or when the actually-flowing lamp current IL is smaller than the lamp current ILS), the error amplifier 43 outputs a signal low in level. As a result, the PWM controller 41 makes the on-duty of the switching device 34 wider to increase the output voltage of the DC step-up circuit 3, thereby increasing the current that flows in the discharge lamp 12.

Thus, the step-up controlling circuit 4 is activated in such a manner that the actually-flowing lamp current is equal to the indicated lamp current. The discharge lamp 12 rapidly reaches the rated light quantity owing to this type of feedback system.

The lamp current control characteristic preset to the current indicating table 73 of the lamp current controlling circuit 7 will now be described in detail by using, as an illustrative example, a 35 W type metal halide lamp which serves as the discharge lamp 12.

Figure 7:
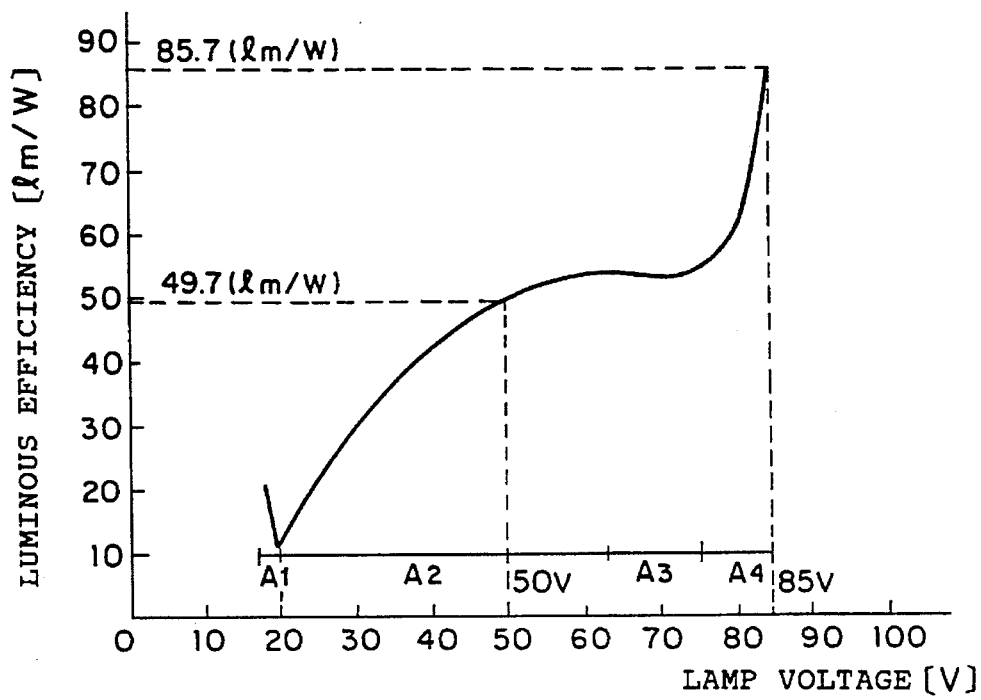
FIG. 7 is a view for describing one example of a relationship between a lamp voltage and luminous efficiency.

FIG. 7 is a view for describing a relationship between each of experimentally-obtained lamp voltages of the discharge lamp 12 and its corresponding luminous efficiency of the discharge lamp 12. The axis of abscissas represents the lamp voltage and the axis of ordinates represents luminous flux (lm:lumen) per 1 W (watt), which is produced by the discharge lamp 12, i.e., luminous efficiency lm/W. The drawing, which describes the relationship shown in FIG. 7 between the lamp voltage and the luminous efficiency, shows the following contents.

During a period A1 in which the lamp voltage is low immediately after the discharge lamp 12 has conducted the start discharge, the starter gas (e.g., xenon gas) emits light. The luminous efficiency at this time is low.

During a period A2 in which the lamp voltage rises to about 60 V, mercury thereafter ionizes vigorously due to an increase in temperature produced inside a luminescent tube so as to increase the vapor pressure of the mercury, thereby increasing the lamp voltage. Since, at this time, the radiation or emission is made in dependence on the mercury, its luminous efficiency also increases with the vapor pressure of the mercury.

During a period A3 in which the luminous efficiency is substantially constant even when the lamp voltage rises, the mercury, which contributes to the decision of the lamp voltage, is in a substantially-evaporated state. Since, however, the emission still depends on the mercury, its luminous efficiency is not so varied.

During a period A4 in which a change in lamp voltage is relatively small but an increase in luminous efficiency is large, a metal halogenide is vigorously evaporated and ionized. Thus, since light is actively emitted by a metal, the luminous efficiency is abruptly raised. Further, a rise in luminous efficiency is stopped when the lamp voltage reaches the final value. A slight rise in lamp voltage, which is produced during this period, takes place due to the vapor pressure of the metal halogenide.

Thus, there is a close relationship between the lamp voltage and the luminous efficiency of the discharge lamp 12. Further, the quantity of light lm emitted by the discharge lamp 12 is determined from the luminous efficiency lm/W× power W. Accordingly, if the power to be supplied at a desired lamp voltage is set taking into consideration the luminous efficiency, then the quantity of light emitted from the discharge lamp 12 can be stabilized.

When the discharge lamp 12 lights up at a rated power of 35 W, for example, the lamp voltage is stabilized at a stationary lamp voltage of 85.0 V. Since the luminous efficiency at this time is 85.7 lm/W, a luminous flux of 3000 lm is produced upon rated lighting, i.e., upon producing an output from the discharge lamp 12 at the light-emission quantity of 100%.

When the lamp voltage is, for example, 50.0 V showing that the lamp voltage is being raised, a luminous efficiency of 49.7 lm/W is obtained. Thus, if power to be supplied or input is set to 3000 (lm)/49.7(m/W)=60.4 W, then a luminous flux of 3000 lm identical to the quantity of light emitted from the discharge lamp 12 upon inputting the rated power is obtained.

Figure 8:
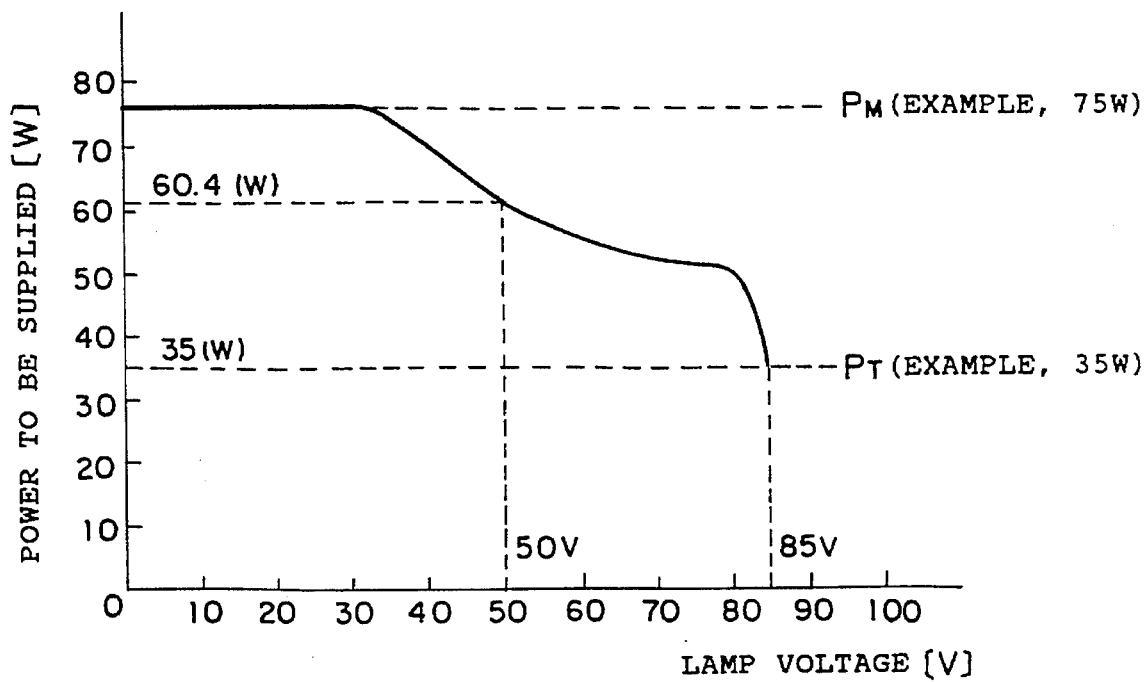
FIG. 8 is a view for describing a relationship between a lamp voltage and power to be supplied, based on the relationship shown in FIG. 7.

A lamp power control characteristic obtained, based on such an idea as described above, to make the quantity of light emitted by the discharge lamp 12 constant, will be shown in FIG. 8. In the same drawing, the axis of abscissas represents a lamp voltage V and the axis of ordinates represents lamp power W supplied to the discharge lamp 12 at a desired lamp voltage.

Since, however, the maximum rated power PM capable of being applied to the discharge lamp 12, e.g., a 75 W is defined for the discharge lamp 12, the lamp power control characteristic is specified or defined in a power range not exceeding the 75 W.

Figure 9:
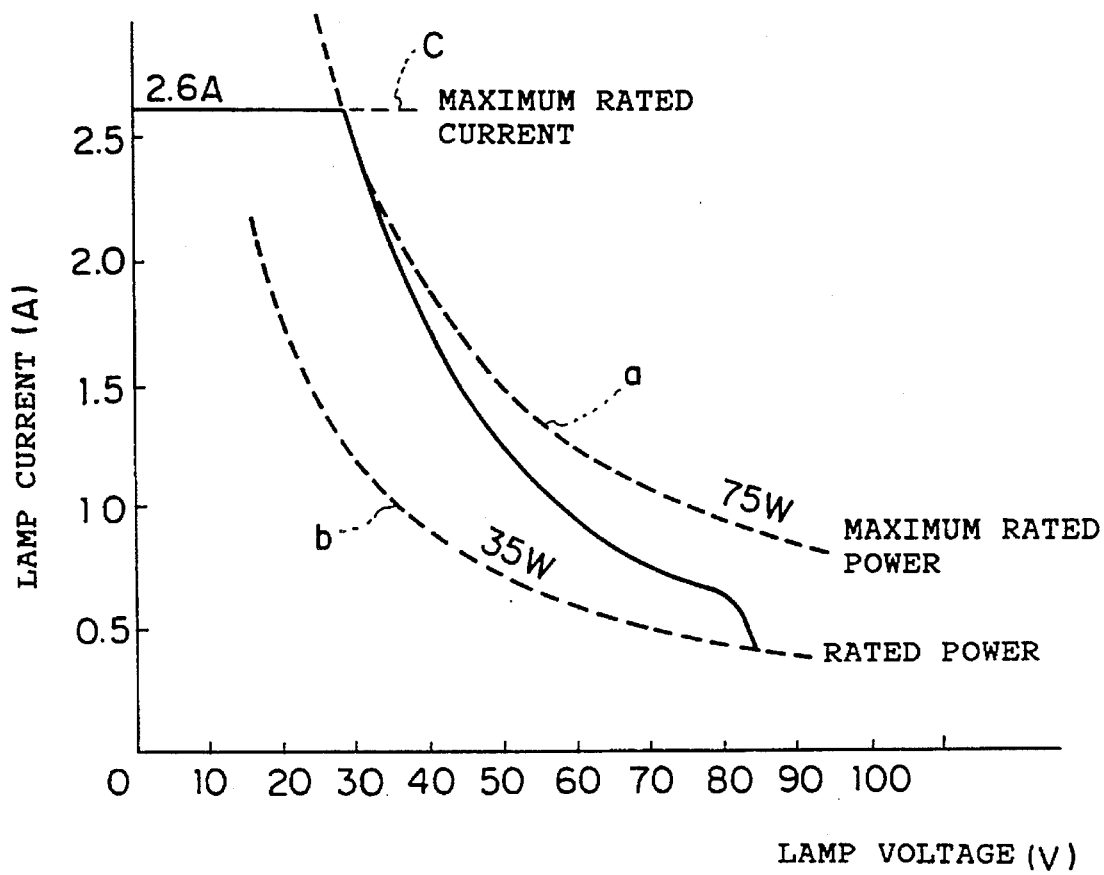
FIG. 9 is a view for describing a lamp current control characteristic of the lighting device shown in FIG. 5.

A lamp current control characteristic obtained based on such a lamp power control characteristic will be shown in FIG. 9. The axis of abscissas represents a lamp voltage V and the axis of ordinates shows a lamp current A to be supplied to the discharge lamp 12 at a desired lamp voltage.

Since, however, the maximum rated current IM capable of being supplied to the discharge lamp 12, e.g., a 2.6 A is defined for the discharge lamp 12 even in FIG. 9, the lamp current control characteristic is determined in a current range not exceeding the current value of 2.6 A.

Figure 10:
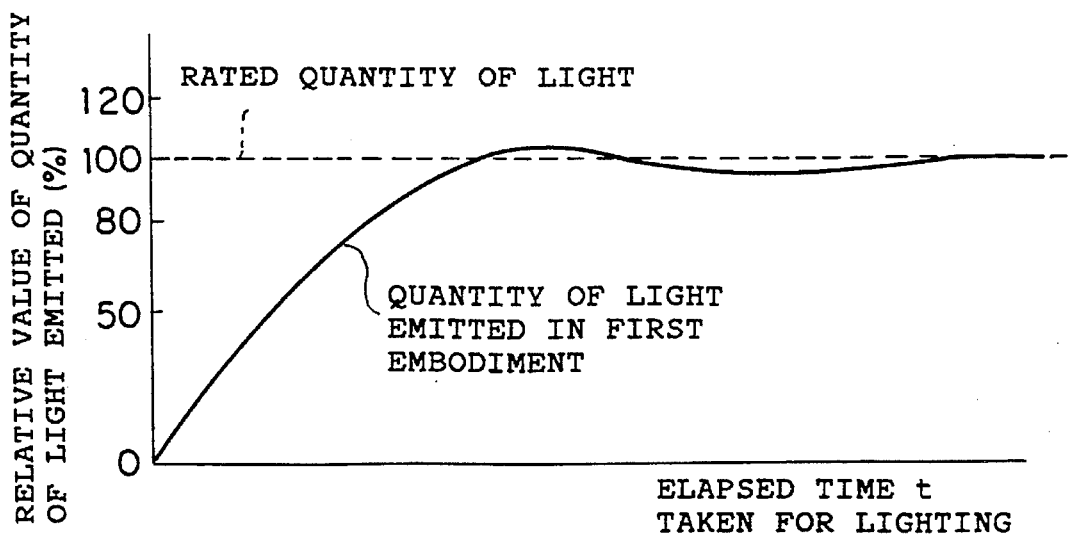
FIG. 10 is a view for explaining a quantity-of-light rise characteristic of the discharge lamp, which is produced based on the characteristic shown in FIG. 9.

A light rise characteristic of the discharge lamp 12, which is shown in FIG. 10, is obtained as a result of execution of feedback control using these prescribed corresponding characteristics. Although changes such as a slight overshoot, a slight undershoot, etc. take place, the quantity of light (optical output) emitted from the discharge lamp 12 can be rapidly raised up to the quantity of light corresponding to 100% in a substantially stepwise manner owing to the provision of the maximum rated power PM and the maximum rated current IM.

Thus, the ideal quantity of light can be obtained by determining the relationship between each lamp voltage and the power to be supplied to the discharge lamp based on the relationship between the lamp voltage and the luminous efficiency and predetermining the relationship between the lamp voltage and the lamp current as the lamp current control characteristic. Now, a problem arises in that the relationship between each lamp voltage and its corresponding luminous efficiency varies depending on variations or nonuniformity produced upon manufacturing the discharge lamp 12 and a secular change thereof.

It is thus necessary to absorb these variations in the discharge lamp 12 in order to stably and stepwise raise the quantity of light emitted from the discharge lamp 12 even if any discharge lamp is used. The inventors have paid their attention to a steady-state or stationary lamp voltage of a discharge lamp to absorb the variations in the discharge lamp.

Figure 11:
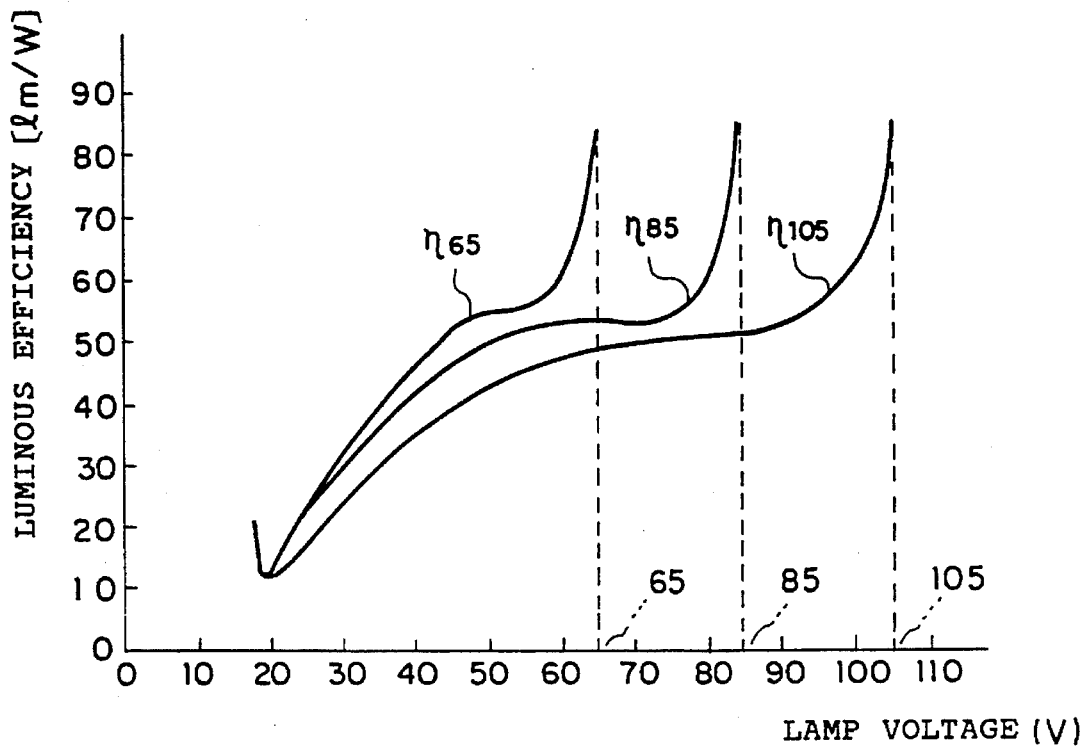
FIG. 11 is a view for describing one example of a relationship between a plurality of lamp voltages and their corresponding luminous efficiency.

FIG. 11 is a view for describing a relationship between lamp voltages of several discharge lamps and their corresponding luminous efficiency. Here, the stationary lamp voltages of the respective discharge lamps are not held constant due to variations or nonuniformity produced upon manufacturing the individual discharge lamps and their secular changes. Therefore, luminous efficiency at desired lamp voltages changes in various ways. Different variations take place like a curve $\eta 65$ (stationary lamp voltage: 65 V), a curve $\eta 85$ (stationary lamp voltage: 85 V) and a curve $\eta 105$ (stationary lamp voltage: 105 V) as shown in FIG. 11, for example.

Thus, if a single corresponding characteristic between a lamp voltage and power to be supplied to an electric discharge lamp, is used to make constant the quantity of emitted light determined from the luminous efficiency, then a difference or variation in luminous efficiency between the lamps cannot be absorbed. Accordingly, the optimum power cannot be supplied to the discharge lamp 12, so that a rapid rise in the quantity of light cannot be achieved.

Figure 12:
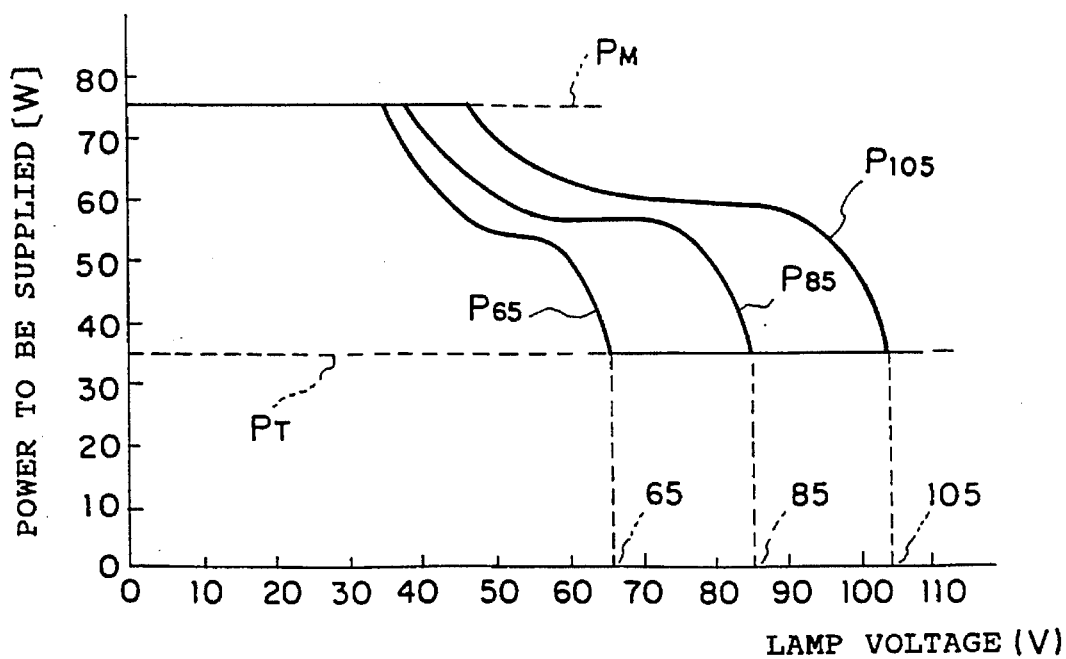
FIG. 12 is a view for explaining a relationship between lamp voltages and input power, which is obtained based on the relationship shown in FIG. 11.

FIG. 12 is a view for describing corresponding characteristics between "lamp voltages and power to be input or supplied to the discharge lamp 12", which have been created depending on the luminous-efficiency curves $\eta 65$, $\eta 85$ and $\eta 105$ shown in FIG. 8 to absorb variations in such a discharge lamp 12 as described above.

Figure 13:
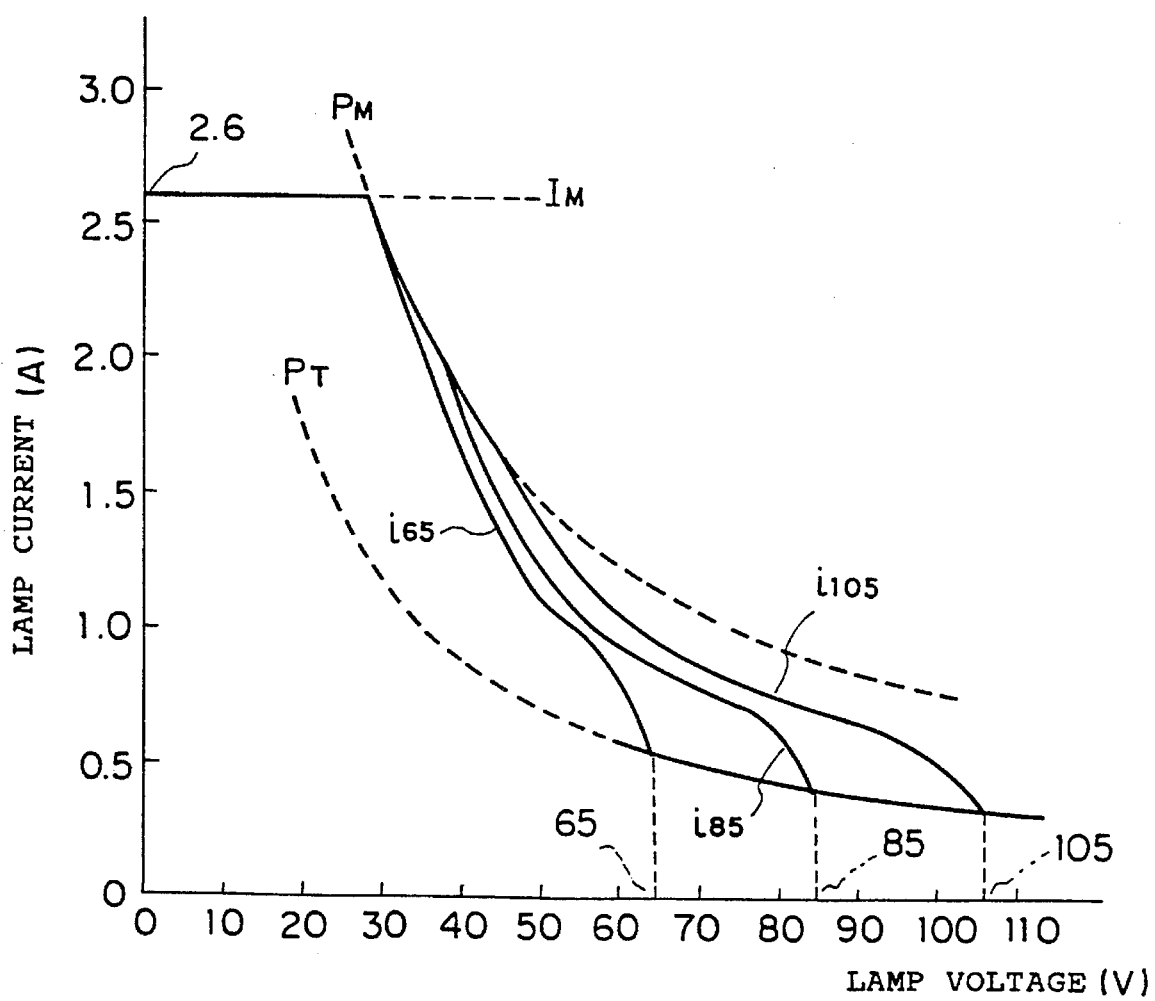
FIG. 13 is a view for describing lamp current control characteristics of the lighting device shown in FIG. 5, for effecting lighting control based on a plurality of control characteristics.

Symbols P65, P85 and P105 shown in FIG. 12 are determined based on the luminous-efficiency curves $\eta 65$, $\eta 85$ and $\eta 105$ respectively. FIG. 13 is a view for describing lamp current control characteristics obtained based on these input power curves P65, P85 and P105.

In FIG. 13, the lamp current control characteristics i65 is determined based on the input power characteristic P65. Similarly, the lamp current control characteristics i85 and i105 are determined based on the input power characteristics P85 and P105. When the stationary lamp voltage is more than or equal to 65 V and less than 85 V, the current is supplied to the discharge lamp 12 in accordance with the lamp current control characteristic of i65. On the other hand, when the lamp voltage exceeds 65 V, the current to be supplied to the discharge lamp 12 is controlled in accordance with the rated power curves.

When the lamp voltage is more than or equal to 85 V and less than 105 V, the current is supplied to the discharge lamp 12 in accordance with the lamp current control characteristic of i85. When the lamp voltage is more than or equal to 105 V, the current is supplied to the discharge lamp 12 in accordance with the lamp current control characteristic of i105. After the lamp voltage has exceeded a voltage corresponding to the lower limit of each lamp current control characteristic, the current to flow in the discharge lamp 12 is controlled in accordance with the rated power curves. Thus, the suitable power can be supplied to the discharge lamp 12 depending on a variation in each discharge lamp.

Referring to FIG. 5, the start-discharge detector circuit 9 detects or decides whether the start discharge is made and sends a signal corresponding to the result of detection to the timer circuit 72 of the lamp current controlling circuit 7. The timer circuit 72 counts a predetermined time interval t4 (e.g., two minutes) since it has received the signal.

The timer circuit 72 outputs a signal to the processing means 71 when it has counted up. Thereafter, the processing means 71 stores therein as a stationary or steady-state lamp voltage VM, the lamp voltage input from the voltage detector circuit 6 when the timer circuit 72 has output the signal to the processing means 71. After the elapse of the predetermined time interval t4, the timer circuit 72 counts a predetermined time interval t5 (e.g., 5 seconds) as needed and updates the stored value for each count-up.

When the following lighting is made, the processing means 71 then selects the above-described lamp current control characteristic from the indicating current table 73 based on the stored value and effects lighting control on the discharge lamp 12. When the stationary lamp voltage VM is greater than or equal to 65 V and less than 85 V (i.e., 65≦VM<85 V), the processing means 71 selects the lamp current control characteristic of i65.

Since a stationary lamp voltage is unknown when one attempts to light a new discharge lamp, the processing means 71 selects a power control characteristic (corresponding to the current control characteristic shown by the i65) indicative of the minimum power to be supplied to the discharge lamp from the indicating current table 73 in order to avoid the lighting of the discharge lamp under excessive power in the vicinity of the stationary lamp voltage and effects lighting control on the discharge lamp.

If a discharge lamp having a stationary lamp voltage of 65 V is incorporated into the lighting device when the lighting control is effected from the beginning in accordance with the lamp current control characteristic of i85 with the rating as the center, for example, then an increase in lamp voltage stops at a point (or a point g) of 65 V on the lamp current control characteristic of i85. Thus, the discharge lamp normally lights up at the excessive power. If, however, the lamp current control characteristic of i65 is selected, then such a situation can be avoided.

The present embodiment shows the lamp current control characteristics about the three kinds of stationary lamp voltages. It is however needless to say that characteristics other than the illustrated three lamp current control characteristics may be stored. As the number of the lamp current control characteristics increases, more suitable power to be applied to the lamp can be determined because a greater number of variations or nonuniformities produced upon manufacturing the discharge lamp and its secular change can be accommodated.

Second embodiment

Figure 14:
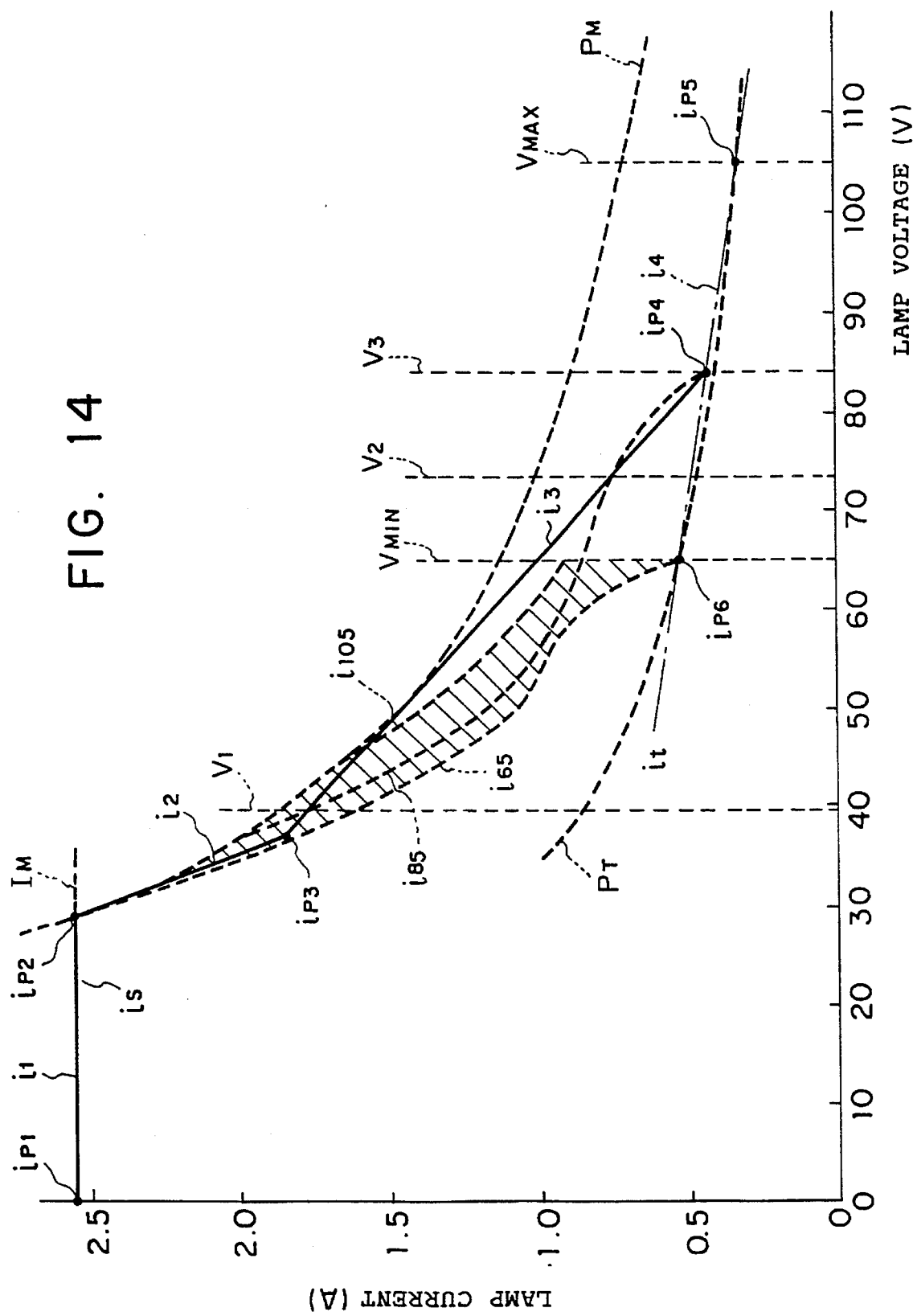
FIG. 14 is a view for explaining a lamp current control characteristic obtained by a device for lighting a discharge lamp, according to a second embodiment of the present invention.

The second embodiment of the present invention will be described below with reference to FIG. 14. In FIG. 14, a curve PM indicated by a dotted line represents a lamp current at each lamp voltage under the maximum rated power of the discharge lamp 12. A curve PT indicated by a dotted line represents a lamp current at each lamp voltage under the rated power. A straight line IM indicated by a dotted line shows the maximum rated current.

Further, dotted lines VMIN and VMAX indicate the minimum rated voltage and the maximum rated voltage respectively. A dashed line it represents a straight line which intersects a rated power curve PT at two points within a range between the minimum rated voltage and the maximum rated voltage of the discharge lamp 12.

The dashed line it represents the straight line obtained by connecting a point indicative of a lower voltage, of the two points, i.e., a point ip6 at which the rated power curve PT intersects the minimum rated voltage VMIN, to a point indicative of a higher voltage, of the two points, i.e., a point ip5 at which the rated power curve PT intersect the maximum rated voltage VMAX.

In the present invention, a plurality of lamp current control characteristics corresponding to respective stationary lamp voltages exist. However, a certain lamp current control characteristic iS of these will first be described by way of illustrative example for the sake of brevity of its description. The lamp current control characteristic iS includes four linear characteristics i1 through i4 obtained by connecting points ip1 through ip5 to each other within a voltage range from a lamp voltage of 0 V to the maximum rated voltage of 105 V.

A description will next be made of the points ip1 through ip5. When the lamp current control characteristic is represented in the form of coordinates (lamp voltage and indicated lamp current), the point ip1 shows a point (where the lamp voltage is 0 V and the maximum rated current of the discharge lamp is shown) and the point ip2 indicates a point (where the maximum rated power of the discharge lamp/the maximum rated current thereof and the maximum rated current of the discharge lamp are shown).

The point ip4 varies depending on the stationary lamp voltage of the discharge lamp. That is, when the stationary lamp voltage is more than or equal to 65 V and less than 85 V as described in the first embodiment, the point ip4 is represented as a point on the straight line it at the lamp voltage of 65 V. On the other hand, when the stationary lamp voltage is more than or equal to 85 V and less than 105 V, the point ip4 is represented as a point on the straight line it at the lamp voltage of 85 V. Further, when the stationary lamp voltage is more than or equal to 105 V, the point ip4 is represented as a point on the straight line it at the lamp voltage of 105 V.

FIG. 14 shows one example in which the point on the straight line it at the lamp voltage of 85 V has been adopted as the point ip4. The point ip3 is represented as a point where a tangential line i2 of the curve PM, which passes through the point ip2, intersects a tangential line i3 of two tangential lines of the curve PM passing through the point ip4, which is drawn within a range of lamp voltages each lower than a lamp voltage at the point ip4. In the example shown in FIG. 14, a fourth approximate straight line i3, which forms the lamp current control characteristic, represents a tangential line of the maximum rated power curve PM of the discharge lamp, which is drawn in the direction of the lamp voltage lower than the stationary lamp voltage.

Figure 15:
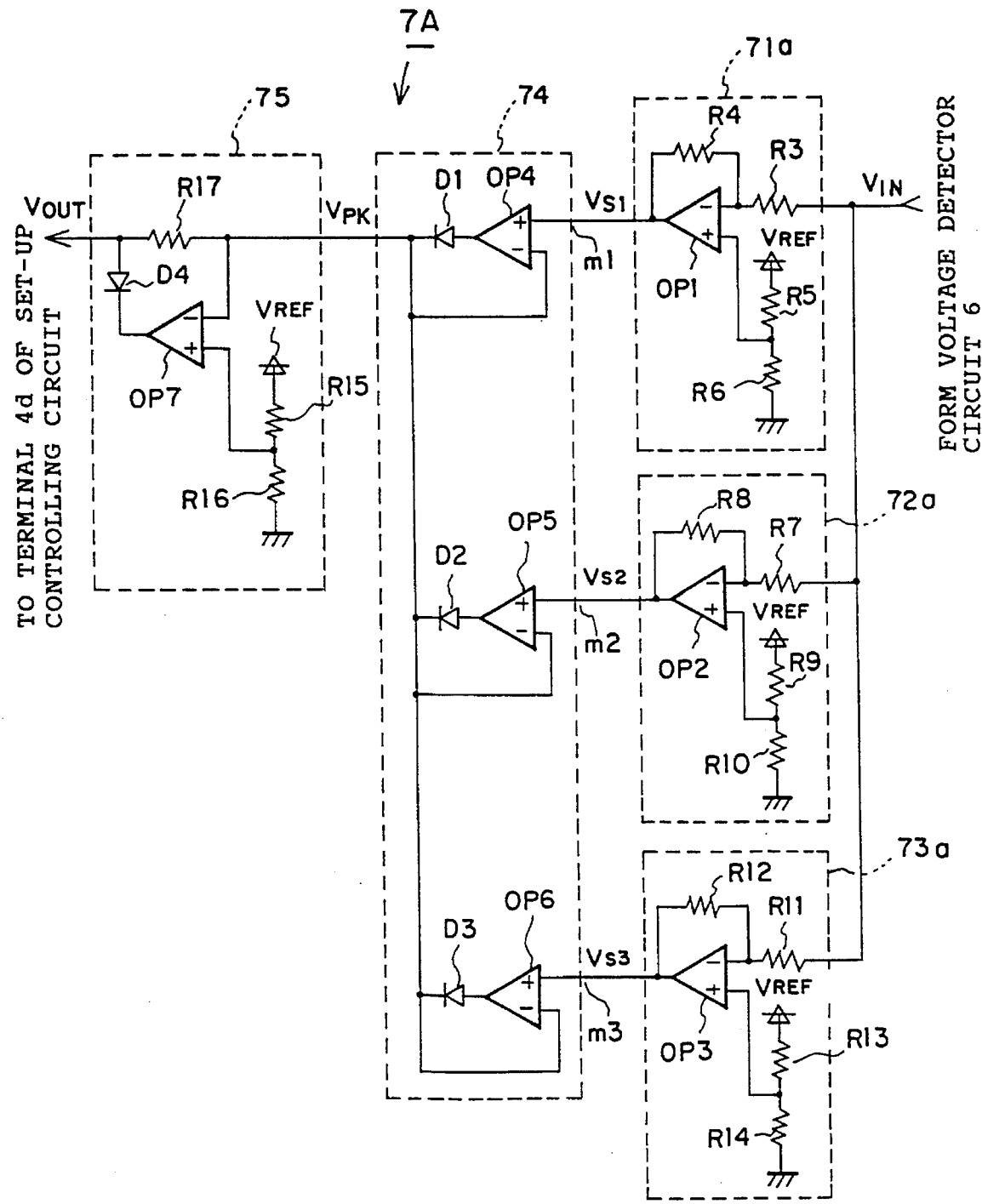
FIG. 15 is a circuit diagram showing a configuration of a lamp current control circuit employed in the lighting device shown in FIG. 14.

FIG. 15 shows a circuit configuration of a lamp current controlling circuit 7A for achieving the above lamp current control characteristic. The lamp current controlling circuit 7A comprises differential amplifying circuits 71a, 72a and 73a, a maximum value selecting circuit 74 and a clipping circuit 75.

An input VIN of the lamp current controlling circuit 7A corresponds to an output produced from a voltage detector circuit 6 and is input to each of the parallel-connected differential amplifying circuits 71a through 73a. The input VIN is input to an inversion input terminal of an OP amp OP1 in the differential amplifying circuit 71a through a resistor R3.

The inversion input terminal of the OP amp OP1 is electrically connected to the output of the OP amp OP1 through a resistor R4. Resistors R5 and R6 are electrically series-connected between a reference power supply VREF and a GND. A voltage dividing point between the resistors R5 and R6 is electrically connected to a non-inversion input terminal of the OP amp OP1.

The differential amplifying circuit 72a comprises resistors R7 through R10 and an OP amp OP2. The differential amplifying circuit 73a is made up of resistors R11 through R14 and an OP amp OP3. Here, input-output characteristics of the three kinds of parallel-connected differential amplifying circuits 71a through 73a are different from each other.

When the resistance values of the resistors 61 and 62 shown in FIG. 5 are respectively represented as R1 and R2, the output VIN produced from the voltage detector circuit 6 is represented as (VIN=) Va R2/(R1+R2) obtained by effecting a voltage-dividing process on the applied voltage with these resistors R1 and R2.

The maximum value selecting circuit 74 has input terminals m1 through m3 which serve so as to input outputs VS1 through VS3 produced from the differential amplifying circuits 71a through 73a to their corresponding non-inversion input terminals of OP amps OP4 through OP6. An inversion input terminal of the OP amp OP4 is electrically connected to a cathode terminal of a diode D1. Further, the inversion input terminal thereof is electrically connected to the output of the OP amp OP4 through the diode D1.

Besides, an inversion input terminal of the OP amp OP5 is electrically connected to a cathode terminal of a diode D2. The inversion input terminal thereof is also electrically connected to the output of the OP amp OP5 through the diode D2. An inversion input terminal of the OP amp OP6 is electrically connected to a cathode terminal of a diode D3 and also connected to the output of the OP amp OP6 through the diode D3.

The inversion input terminals of the OP amps OP4 through OP6 are respectively wired-OR connected to one another through the diodes D1 through D3 so as to serve as the output of the maximum value selecting circuit 74.

The output of the maximum value selecting circuit 74 is electrically connected to an inversion input terminal of an OP amp OP7 of the clipping circuit 75. Further, the output thereof is also electrically connected to an anode terminal of a diode D4 through a resistor R17. A cathode terminal of the diode D4 is electrically connected to the output of the OP amp OP7.

Resistors R15 and R16 are electrically connected between the reference power supply VREF and the GND. A voltage dividing point between the resistors R15 and R16 is electrically connected to a non-inversion input terminal of the OP amp OP7. A junction point or node between the resistor R17 and the diode D4 is electrically connected to the input terminal 4d of the step-up controlling circuit 4 as the output of the lamp current controlling circuit 7A.

Operations of these circuits will next be described below. An input-output characteristic of the differential amplifying circuit 71a is represented as $VS1=\{R6/(R5+R6)\}\{1+R4/R3\}VREF-(R4/R3)VIN$. Similarly, input-output characteristics of the differential amplifying circuits 72a and 73a are respectively represented as $VS2=\{R10/(R9+R10)\}\{1+(R8/R7)\}VREF-(R8/R7)VIN$ and $VS3=(R14/(R13+R14)\}\{1+(R12/R11)\}VREF-(R12/R11)VIN$.

Figure 16:
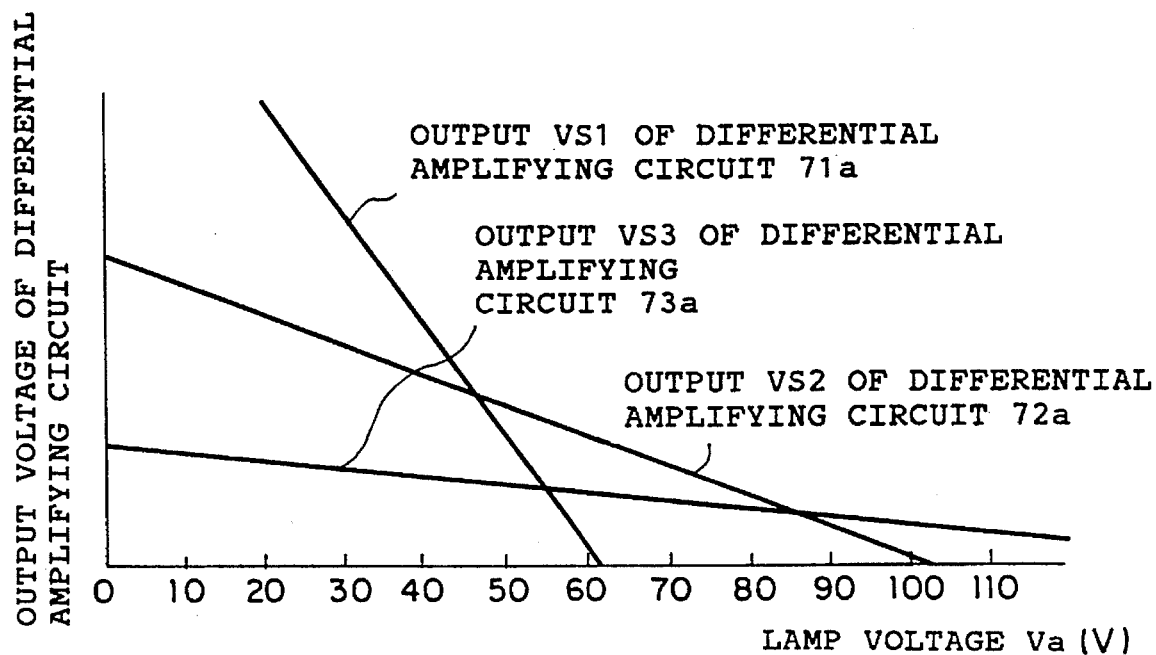
FIG. 16 is a view for describing output voltages produced from differential amplifying circuits employed in the lamp current controlling circuit shown in FIG. 15.

Here, VIN is equal to $Va\{R2/(R1+R2)\}$. The input-output characteristics of the respective differential amplifying circuits 71a through 73a can be freely varied by changing the resistance values of the respective resistors of the differential amplifying circuits 71a through 73a. The input-output characteristics of the differential amplifying circuits 71a through 73a will be shown in FIG. 16 as one example.

Figure 17:
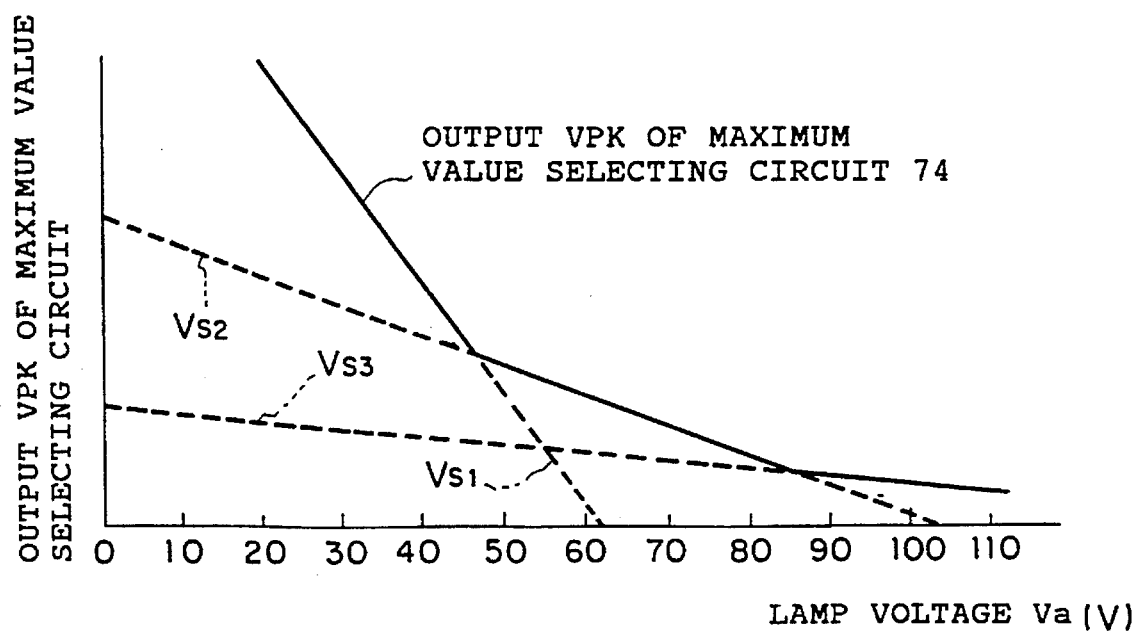
FIG. 17 is a view for explaining output voltages produced from a maximum value selecting circuit employed in the lamp current controlling circuit shown in FIG. 15.

The outputs produced from the differential amplifying circuits 71a through 73a are input to the maximum value selecting circuit 74. Since the maximum value selecting circuit 74 outputs the applied inputs through the wired-OR connection therefrom, the maximum value selecting circuit 74 outputs the maximum one of the input signals VS1 through VS3 in preference to others. Accordingly, the output VPK produced from the maximum value selecting circuit 74 is represented as indicated by a solid line in FIG. 17. Incidentally, dotted lines represent the outputs shown in FIG. 16, which are produced from the differential amplifying circuits 71a through 73a.

The output of the maximum value selecting circuit 74 is input to the clipping circuit 75. The input supplied to the clipping circuit 75 from the maximum value selecting circuit 74 is limited by a voltage $VCP=\{R16/(R15+R16)\}VREF$ at the non-inversion input terminal of the OP amp OP7, so that the restricted input is produced as the output of the lamp current controlling circuit 7A. The resistor R17 is of a current-limiting resistor for preventing excessive current from flowing in the OP amp OP7 through the diode D4.

An output voltage VOUT of the lamp current controlling circuit 7A indicates current to flow in the discharge lamp 12 at the desired lamp voltage Va as described in the first embodiment. The value of the current, which corresponds to the value of the lamp voltage, is equal to that of current corresponding to the voltage developed across the current detector circuit 5 and input to the input terminal 4c of the step-up controlling circuit 4.

When the current to flow in the discharge lamp 12 at the time that the voltage developed across the current detector circuit 5 is 1 V, is 1 A, for example, the output voltage VOUT= 1 V of the lamp current controlling circuit 7A also means an indicated current of 1 A.

When the lamp voltage is less than a voltage at a point Vp2, the output voltage VOUT of the lamp current controlling circuit 7A is represented as a characteristic of a straight line v1 indicative of $vS=\{R16/(R15+R16)\}VREF$. On the other hand, when the lamp voltage is more than or equal to a voltage at a point Vp3 and less than a voltage at a point Vp4, the output voltage VOUT of the lamp current controlling circuit 7A is represented as a characteristic of a straight line v2 indicative of $vS=\{R6/(R5+R6)\}\{1+R4/R3\}VREF-(R4/R3)\{R2/(R1+R2)\}Va$.

When the lamp voltage is more than or equal to the voltage at the point Vp3 and less than the voltage at the point Vp4, the output voltage VOUT of the lamp current controlling circuit 7A is represented as a characteristic of a straight line v3 indicative of $vS=\{R10/(R9+R10)\}\{1+(R8/R7)\}VREF-(R8/R7)\{R2/(R1+R2)\}Va$.

Further, when the lamp voltage is more than or equal to the voltage at the point Vp4, the lamp current controlling circuit 7A outputs a voltage corresponding to a straight line v4 indicative of vS={R14/(R13+R14)}{1+(R12/R11)}VREF− (R12/R11){R2/(R1+R2)}Va.

Figure 18:
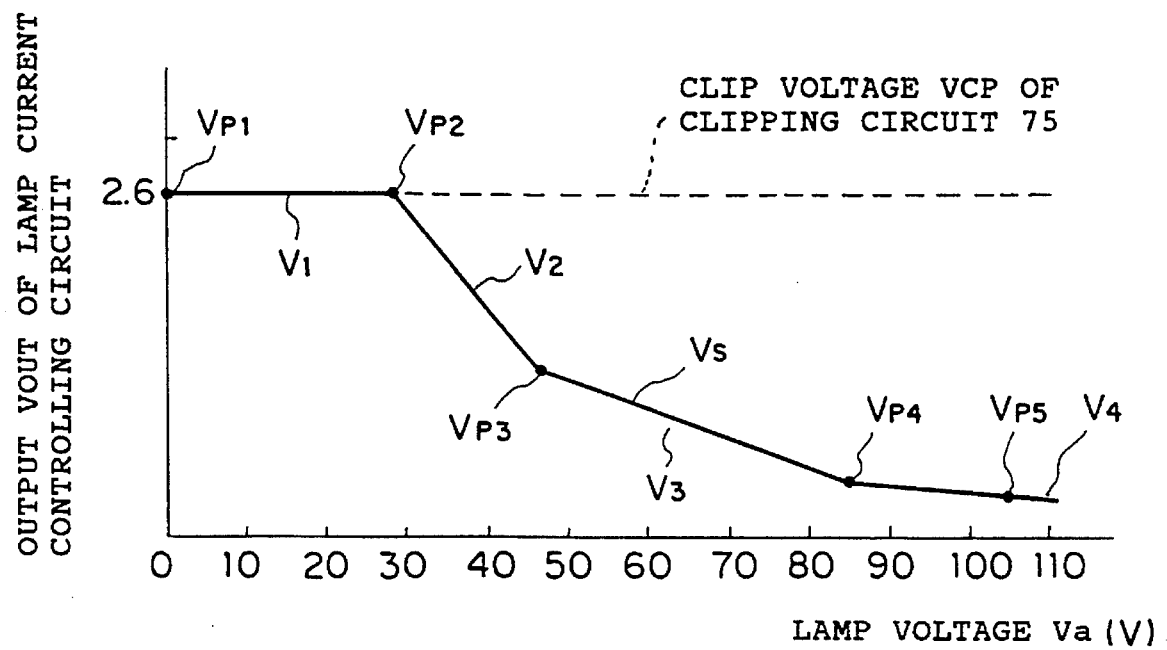
FIG. 18 is a view for describing an output voltage produced from the lamp current controlling circuit shown in FIG. 15.

Here, the points Vp1 through Vp5 respectively correspond to the points ip1 through ip5 shown in FIG. 14. Further, the straight lines vS and v1 through v4 respectively correspond to the straight lines iS and i1 through i4. Accordingly, the lamp current control characteristic shown in FIG. 18 can be realized owing to such a circuit configuration. Here, the lamp current control characteristic falls within a range less than or equal to the maximum rated power, the maximum rated current and the maximum rated voltage of the discharge lamp 12 and is represented substantially in the form of a bent line in which the respective intersection points of at least four approximate straight lines i1 through i4, which exist on the lamp-voltage vs lamp-current coordinates, are represented as ip1 through ip4 which serve as vertexes. The first approximate straight line is represented as a straight line obtained by connecting a first coordinate point (0, maximum rated current of discharge lamp) and a second coordinate point (maximum rated power of discharge lamp/maximum rated current thereof, maximum rated current thereof) to each other.

The second approximate straight line is represented as a tangential line of the maximum rated power curve corresponding to the maximum rated power of the discharge lamp, which passes through the second coordinate point. The third approximate straight line is represented as a straight line which intersects a rated power curve corresponding to the rated power of the discharge lamp at two coordinate points within a range between the minimum rated voltage of the discharge lamp and the maximum rated voltage thereof. The fourth approximate straight line is represented as a straight line which passes through a third coordinate point indicated by the stationary lamp voltage on the third approximate straight line and which is directed toward the second approximate straight line.

Figure 19:
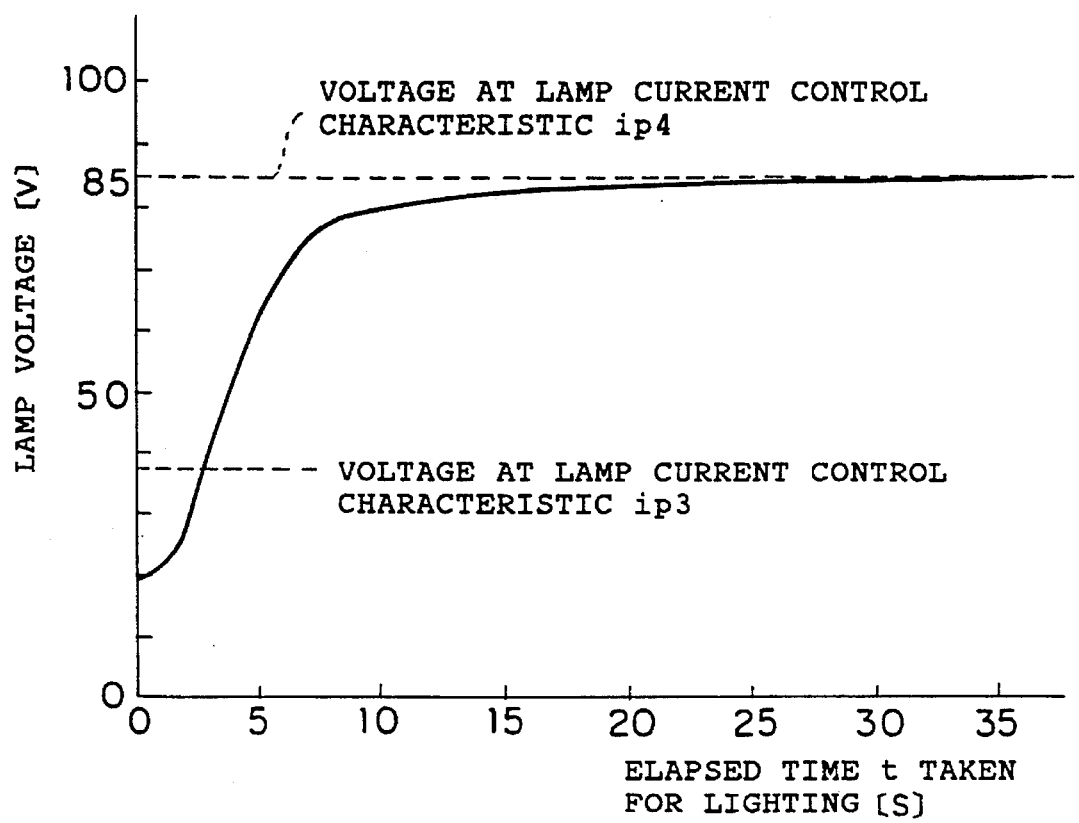
FIG. 19 is a view for describing a rise characteristic of a lamp voltage.

A description will now be made of a change in lamp voltage with time from the lighting of the discharge lamp to the stabilization of the discharge lamp at the stationary lamp voltage with reference to FIG. 19. FIG. 19 is a view for describing the process of a rise in lamp voltage at the time that the axis of abscissas is represented as a time interval and the axis of ordinates is represented as a lamp voltage. The lamp voltage abruptly rises after the lighting has been started. In time, the lamp voltage is gently raised and is thereafter saturated and stabilized.

Since the lamp voltage varies in this way after the discharge lamp has lighted up, a time interval required for the lamp voltage to pass through the points ip3 and ip4 different in the rate of change in current (power) to be supplied or input from each other, is short. Further, since the points ip3 and ip4 exist during a period in which the luminous efficiency is low, there is no produced flickering or fluctuation in the quantity of light emitted from the discharge lamp and an abrupt change in the quantity of light emitted therefrom. Even if any flicker occurs, its level is of a level that cannot be visually observed.

The flexion or bending of the curve about the input current at the point ip4 exists during a period in which the luminous efficiency is high. Since, however, an increase in lamp voltage is slow, a time interval required for the lamp voltage to pass through the above flexion at the point ip4 is also slow. Accordingly, the flexion at the point ip4 is practically nothing in view of the time. That is, such an influence that the flickering that takes place is not exerted on the emission of light from the discharge lamp.

Figure 20:
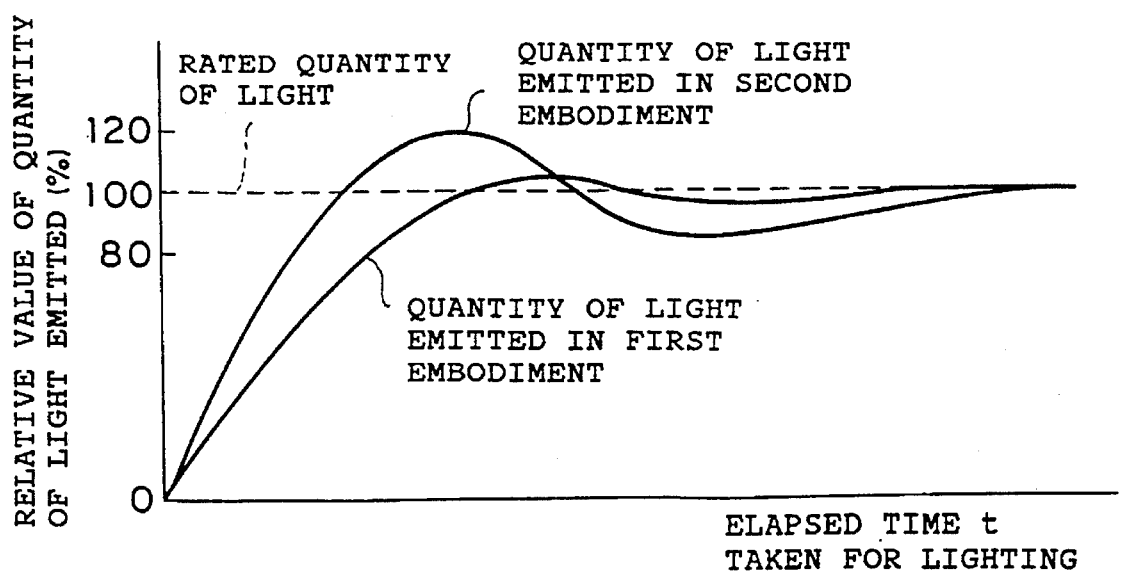
FIG. 20 is a view for explaining rise characteristics of the quantity of light emitted from the discharge lamp shown in FIG. 14.

FIG. 20 shows a quantity-of-light rise characteristic obtained when a discharge lamp having a stationary lamp voltage of 85 V is lighted using the lamp current controlling circuit 7A of the present invention. The lighting device according to the present embodiment supplies more current as compared with the case where the lighting device of the first embodiment in which the luminous efficiency has been taken into consideration within a lamp-voltage range of V1 to V2 supplies the lamp current i85. Thus, although an overshoot occurs, a time interval required to reach the quantity of light corresponding to 100% is made shorter.

Since the lamp current less than the lamp current i85 employed in the first embodiment flows, a slight undershoot takes place. However, each of the overshoot and the undershoot does not exceed 20% of the rated quantity of light. This is a level which is practically out of the question.

That is, the present embodiment can obtain the quantity of light emitted from the discharge lamp, which is practically out of the question owing to both a simple control algorithm that the lamp current control characteristic falling within the lamp voltage range from the lamp voltage of 0 V to the maximum rated voltage is represented by the bent line obtained by combining the above-described at least four straight lines together and an inexpensive circuit configuration.

Further, since the above i3 is set as the tangential line of the maximum rated power curve as described in this invention, a rise in the light level can be made faster.

Figure 21:
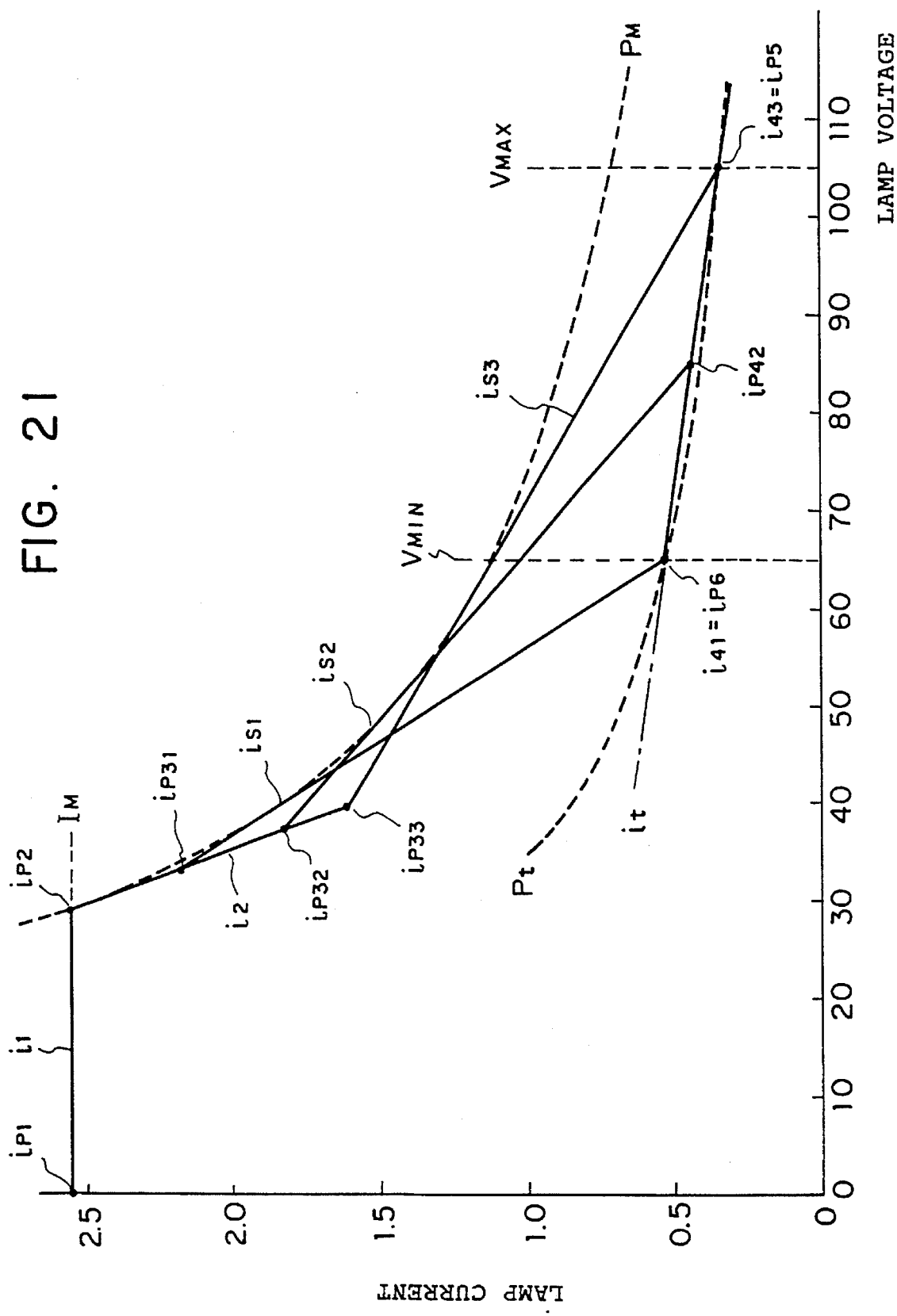
FIG. 21 is a view for describing lamp current control characteristics of the lighting device shown in FIG. 14, for effecting lighting control based on a plurality of control characteristics.

Only one lamp current control characteristic has been described until now for the sake of simplification of description. However, a description will next be made of a plurality of lamp current control characteristics corresponding to various stationary lamp voltages. FIG. 21 is a view for describing a plurality of lamp current control characteristics.

A lamp current control characteristic iS1 is represented as a characteristic obtained by connecting points ip1, ip2, ip31, ip41 and ip5 to one another and a control characteristic obtained when a stationary lamp voltage is more than or equal to 65 V and less than 85 V. A lamp current control characteristic iS2 is represented as a characteristic obtained by connecting the points ip1 and ip2, points ip32 and ip42 and the point ip5 to one another and a control characteristic obtained when the stationary lamp voltage is more than or equal to 85 V and less than 105 V. A lamp current control characteristic iS3 is represented as a control characteristic obtained by connecting the points ip1 and ip2, points ip33 and ip43 to one another and based on a straight line it subsequently to a point ip43.

Here, points ip3X and ip4X (X=1 to 3) on the individual lamp current control characteristics represent points which make sense similar to the above points ip3 and ip4.

Figure 22:
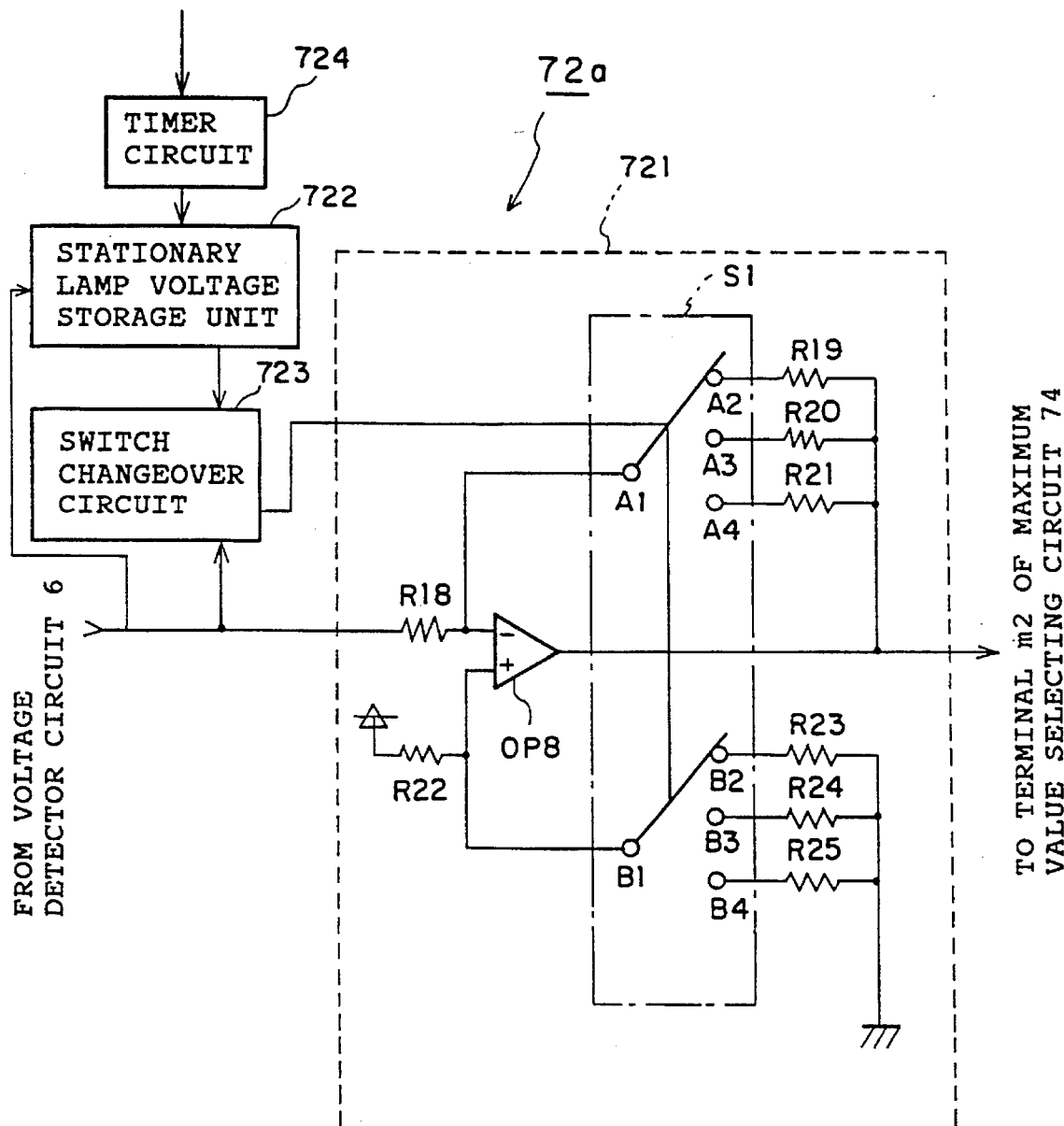
FIG. 22 is a circuit diagram for describing a configuration of a differential amplifying circuit employed in the lamp current controlling circuit for effecting lighting control based on a plurality of control characteristics.

The plurality of lamp current control characteristics can be realized by setting the differential amplifying circuit 72a to a circuit configuration shown in FIG. 22. The differential amplifying circuit 72a comprises a stationary lamp voltage storage unit 722, a switch changeover circuit 723, a timer circuit 724 and a differential amplifying unit 721.

The differential amplifying unit 721 is made up of a switch S1, an OP amp OP8 and resistors R18 through R25. An input-output characteristic is changed by switching contacts of the switch S1. Incidentally, the switch S1 has contacts A1 through A4 and contacts B1 through B4 and switches the contacts in response to a signal supplied from the switch changeover circuit 723.

When the stationary lamp voltage is more than or equal to 65 V and less than 85 V, the contacts A1 and A2 and B1 and B2 of the switch S1 are respectively brought into a conducting state. When the stationary lamp voltage is more than or equal to 85 V and less than 105 V, the contacts A1 and A3 and B1 and B3 of the switch S1 are respectively held in conduction. When the stationary lamp voltage is more than or equal to 105 V, the contacts A1 and A4 and B1 and B4 of the switch S1 are respectively allowed to conduct.

The stationary lamp voltage storage unit 722 is made up of a memory or the like. When the stationary lamp voltage storage unit 722 receives a lamp voltage from the voltage detector circuit 6 and is supplied with a signal from the timer circuit 724, it stores the received lamp voltage therein as a stationary lamp voltage. The switch changeover circuit 723 receives signals from the voltage detector circuit 6 and the stationary lamp voltage storage unit 722 therein as inputs and switches over the contacts of the switch S1 in response to the input signals.

The timer circuit 724 receives a signal indicative of success in starting the discharge of the lamp from the start-discharge detector circuit 9 and counts a predetermined time interval t4 (e.g., two minutes) which has elapsed since the input of the signal to the timer circuit 724. Further, the timer circuit 724 sends a storage urging or jogging signal to the stationary lamp voltage storage unit 722 after the elapse of the predetermined time interval t4. Thereafter, the timer circuit 724 sends the storage jogging signal to the stationary lamp voltage storage unit 722 each time a predetermined time interval t5 (e.g., 5 seconds) elapses.

The differential amplifying unit 721 forms a circuit comprised of the resistors R18, R19, R22 and R23 and the OP amp OP8 by respectively bringing the contacts A1 and A2 and B1 and B2 of the switch S1 of the differential amplifying unit 721 into the conducting state when the stationary lamp voltage of the discharge lamp is more than or equal to 65 V and less than 85 V.

An output VS65 produced from the circuit is represented as $VS65=\{R23/(R22+R23)\}\{1+(R19/R18)\}VREF-(R19/R18)\{R2/(R1+R2)\}Va$. The respective resistance values of the resistors are determined in such a manner that an input-output characteristic of the VS65 is created as a linear characteristic obtained by connecting the points ip31 and ip41 on the lamp current control characteristic iS1 to each other.

Further, the differential amplifying unit 721 forms a circuit comprising the resistors R18, R20, R22 and R24 and the OP amp OP8 by respectively bringing the contacts A1 and A3 and B1 and B3 of the switch S1 of the differential amplifying unit 721 into the conducting state when the stationary lamp voltage is more than or equal to 85 V and less than 105 V.

If an output produced from the circuit is represented as VS85, then the output $VS85=R24/(R22+R24)\{1+(R20/R18)\}VREF-(R20/R18)\{R2/(R1+R2)\}Va$. The respective resistance values of the resistors are determined in such a way that an input-output characteristic of the VS85 is produced as a linear characteristic obtained by connecting the points ip32 and ip42 on the lamp current control characteristic iS2 to each other.

By respectively bringing the contacts A1 and A4 and B1 and B4 of the switch S1 of the differential amplifying unit 721 into the conducting state when the stationary lamp voltage is more than or equal to 105 V, the differential amplifying unit 721 forms a circuit made up of the resistors R18, R21, R22 and R25 and the OP amp OP8.

If an output produced from the circuit is represented as VS105, then the output $VS105=\{R25/(R22+R25)\}\{1+(R21/R18)\}VREF-(R21/R18)\{R2/R1+R2)\}Va$. The respective resistance values of the resistors are selected in such a manner that an input-output characteristic of the VS85 is represented as a linear characteristic obtained by connecting the points ip32 and ip42 on the lamp current control characteristic iS2 to each other.

When the discharge lamp 12 is inserted into this lighting device and is held in a state before the first lighting, i.e., in an initial state, the stationary lamp voltage storage unit 722 temporarily stores therein a voltage 65 V which provides the minimum power to be supplied or input. Further, the switch changeover circuit 723 holds the contacts A1 and A2 and B1 and B2 in conduction. As a result, the lamp current control characteristic is obtained as iS1.

When the lighting switch 2 is turned on and the discharge lamp 12 lights up, the lamp current flows with an increase in the lamp voltage in accordance with the lamp current control characteristic iS1. Next, the lamp voltage gradually increases in a gentle manner and is thereafter saturated and stabilized at a predetermined lamp voltage (i.e., the lamp voltage reaches a stationary lamp voltage).

After the elapse of the predetermined time interval t4, the stationary lamp voltage storage unit 722 stores therein the lamp voltage as a stationary lamp voltage in response to the output supplied from the timer circuit 724. Thereafter, the stored value is updated each time the predetermined time interval t5 elapses. The switch changeover circuit 723 switches over the contacts of the switch S1 in response to the stored voltage value.

When the stationary lamp voltage is 86 V, the switch changeover circuit 723 switches over the contacts of the switch S1 so as to hold the contacts A1 and A2 and B1 and B2 in conduction. As a result, the lamp current control characteristic changes from the iS1 to the iS2.

When the discharge lamp 12 is turned off and lights up again, the lamp current then provides lighting stable with respect to an increase in the lamp voltage in accordance with the lamp current control characteristic iS2 in which the characteristic of the discharge lamp has been taken into consideration.

When the value of the lamp voltage input from the voltage detector circuit 6 falls below than the value stored in the stationary lamp voltage storage unit 722 during a period excluding the elapse of the initial predetermined period t4 after the lighting of the discharge lamp 12, the switch changeover circuit 723 immediately switches over the contacts of the switch S1 to the side corresponding to the iS1 which provides the minimum power to be supplied. However, the value stored in the stationary lamp voltage storage unit 722 remains unupdated until the predetermined time interval t5 elapses.

Figure 23:
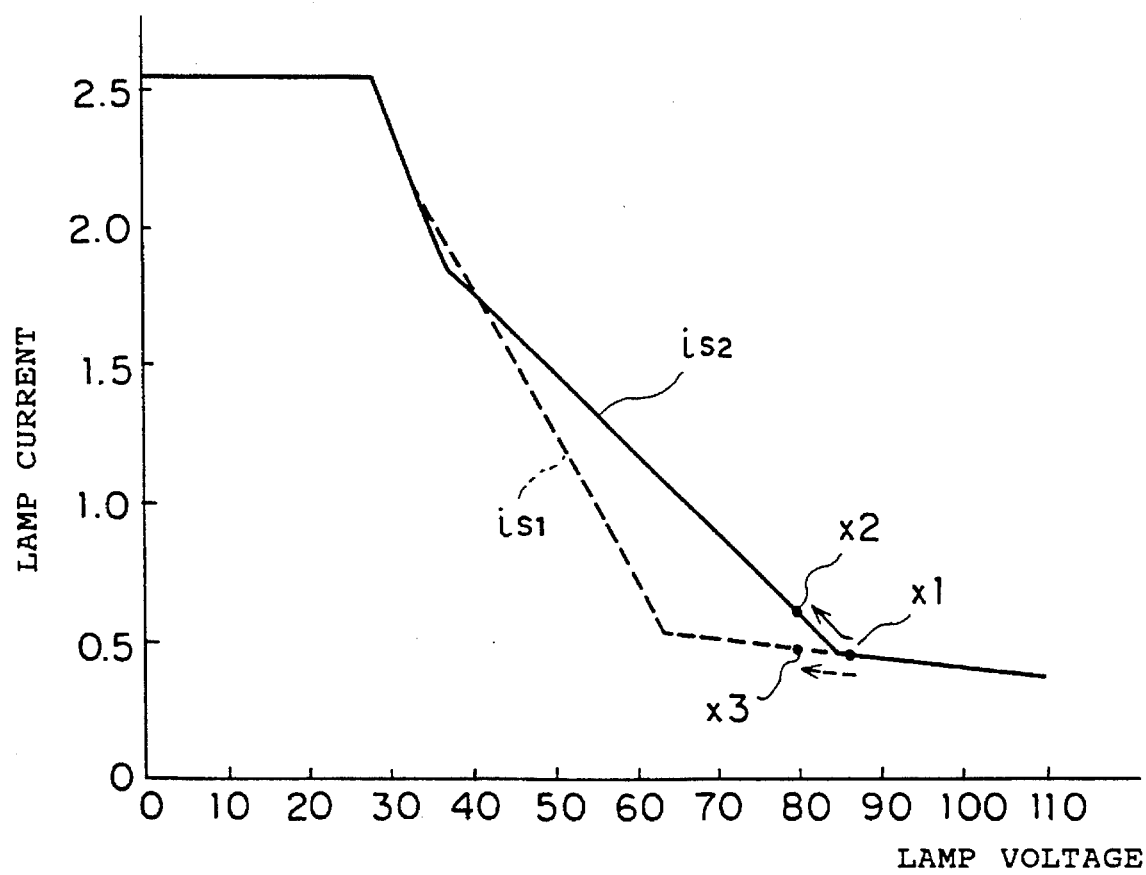
FIG. 23 is a view for explaining variations in lamp current control characteristic produced upon decreasing a stationary lamp voltage.

If the lamp voltage is lowered and falls below 85 V due to a variation in the discharge lamp 12 or a change in the environment when the lamp voltage is stabilized at 86 V as shown in FIG. 23, for example, and the discharge lamp 12 lights up at an operating point x1 on the lamp current control characteristic iS2, then the operating point changes from x1 to x2. Therefore, the discharge lamp 12 lights up in an overpowered state until the predetermined time interval t5 elapses and the stationary lamp voltage storage unit 722 updates the stored value.

Thus, when the value of the lamp voltage input from the voltage detector circuit 6 falls below the value stored in the stationary lamp voltage storage unit 722, the switch changeover circuit 723 immediately switches over the contacts of the switch S1 to the side corresponding to the iS1 which provides the minimum power to be supplied. In doing so, the lamp current control characteristic is changed to the iS1 indicated by a dotted line and the operating point is brought to x3, thereby making it possible to maintain the lighting of the discharge lamp at the rated power.

Further, the contacts of the switch S1 are simply switched and the value stored in the stationary lamp voltage storage unit 722 remains unupdated until the predetermined time interval t5 elapses. Thus, the probability of erroneously updating the stored value where a decrease in the lamp voltage is temporary or transitory due to noise or the like, is reduced. As a result, the discharge lamp can be started up at the optimum power even in the case of the next lighting.

The present embodiment shows the case where the bent line obtained by combining the four straight lines corresponding to the minimum for realizing this invention is used as the lamp current control characteristic having the lamp-voltage range from the lamp voltage of 0 V to the maximum rated voltage. It is however needless to say that the number of straight lines may be more than four. The lamp current control characteristic can further approach a characteristic created based on the luminous efficiency owing to an increase in the number of straight lines, so that a characteristic in which the quantity of light or light level rises smoother, can be obtained.

The present embodiment also describes the lamp current controlling circuit 7A having the three kinds of lamp current control characteristics corresponding to the three stationary lamp voltages. It is however needless to say that the number of lamp current control characteristics may be increased or decreased. The more the number of lamp current control characteristics increases, the more the variations in the discharge lamp can be absorbed.

Third embodiment

Figure 24:
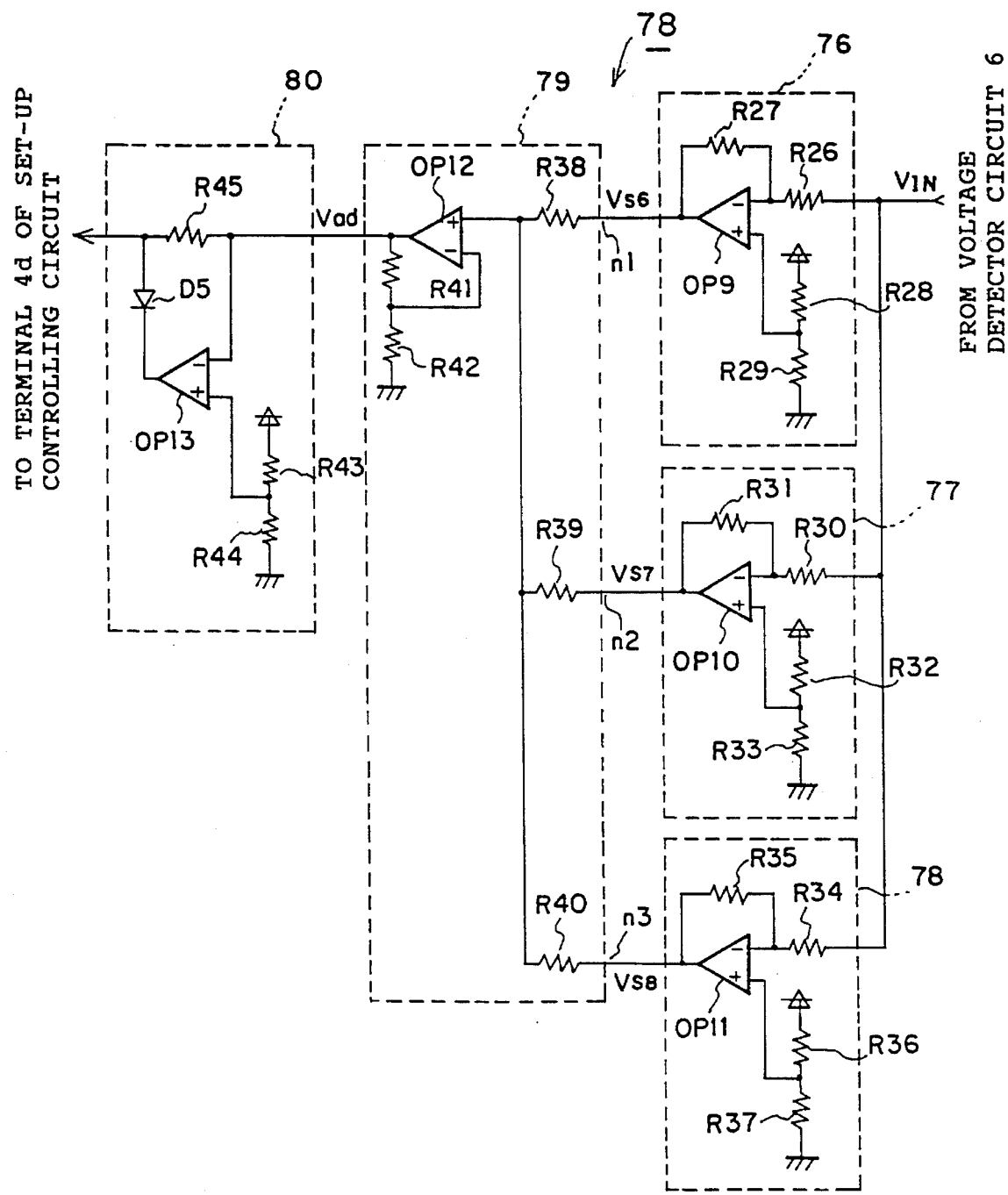
FIG. 24 is a circuit diagram showing a configuration of a lamp current controlling circuit employed in a device for lighting a discharge lamp, according to a third embodiment of the present invention.

The third embodiment of the present invention will be described below with reference to FIG. 24. The second embodiment makes use of the lamp current controlling circuit 7A shown in FIG. 15 for realizing the lamp current control characteristic shown in FIG. 14. However, the present embodiment adopts a lamp current controlling circuit 7B shown in FIG. 24.

The lamp current controlling circuit 7B is made up of differential amplifying circuits 76 through 78, an adder circuit 79 and a clipping circuit 80.

An input VIN of the lamp current controlling circuit 7B corresponds to an output produced from a voltage detector circuit 6 and is input to each of the parallel-connected differential amplifying circuits 76 through 78. The input VIN is input to an inversion input terminal of an operational amplifier (hereinafter abbreviated as an "OP amp") OP9 in the differential amplifying circuit 76 through a resistor R26.

The inversion input terminal of the OP amp OP9 is electrically connected to the output of the OP amp OP9 through a resistor R27. Resistors R28 and R29 are electrically series-connected between a reference power supply VREF and a GND. A voltage dividing point between the resistors R28 and R29 is electrically connected to a non-inversion input terminal of the OP amp OP9.

The differential amplifying circuit 77 comprises resistors R30 through R33 and an OP amp OP10. The differential amplifying circuit 78 is made up of resistors R34 through R37 and an OP amp OP11. Output characteristics of the three kinds of parallel-connected differential amplifying circuits 76 through 78 are different from each other.

When the resistance values of the resistors 61 and 62 shown in FIG. 5 are respectively represented as R1 and R2, the output VIN produced from the voltage detector circuit 6 is represented as (VIN=) Va R2/(R1+R2) obtained by effecting a voltage-dividing process on the applied voltage with these resistor R1 and R2.

The adder circuit 79 has three input terminals n1 through n3 which respectively receive outputs VS6 through VS8 produced from the differential amplifying circuits 76 through 78. The input terminals n1, n2 and n3 are respectively electrically connected to a non-inversion input terminal of an OP amp OP12 through resistors 38, 39 and 40.

An inversion input terminal of the OP amp OP12 is electrically connected to a voltage dividing point provided between resistors R41 and R42 series-connected between an output terminal of the OP amp OP12 and a GND. An output, which appears at the output terminal of the OP amp OP12, is supplied to a clipping circuit 80 as an output Vad used for the adder circuit 79 as it is.

The output of the adder circuit 79 is electrically connected to an inversion input terminal of an OP amp OP13 which forms the clipping circuit 80. Further, the output of the adder circuit 79 is also electrically connected to an anode terminal of a diode D5 through a resistor R45. A cathode terminal of the diode D5 is electrically connected to the output of the OP amp OP13.

Resistors R43 and R44 are electrically series-connected between the reference power supply VREF and the GND. A voltage dividing point between resistors R43 and R44 is electrically connected to a non-inversion input terminal of the OP amp OP13. A junction point or node between the resistor R45 and the diode D5 is electrically connected to an input terminal 4d of a step-up controlling circuit 4 as the output of the lamp current controlling circuit 7.

Input-output characteristics of the differential amplifying circuits 76 through 78 are respectively represented as VS6={R29/(R28+R29)}{1+(R27/R26)}VREF−(R27/R26)VIN, VS7={R33/(R32+R33)}{1+R31/R30}VREF−(R31/R30)VIN, and VS8={R37/(R36+R37)}{1+R35/R34}VREF−(R35/R34)VIN.

Figure 25:
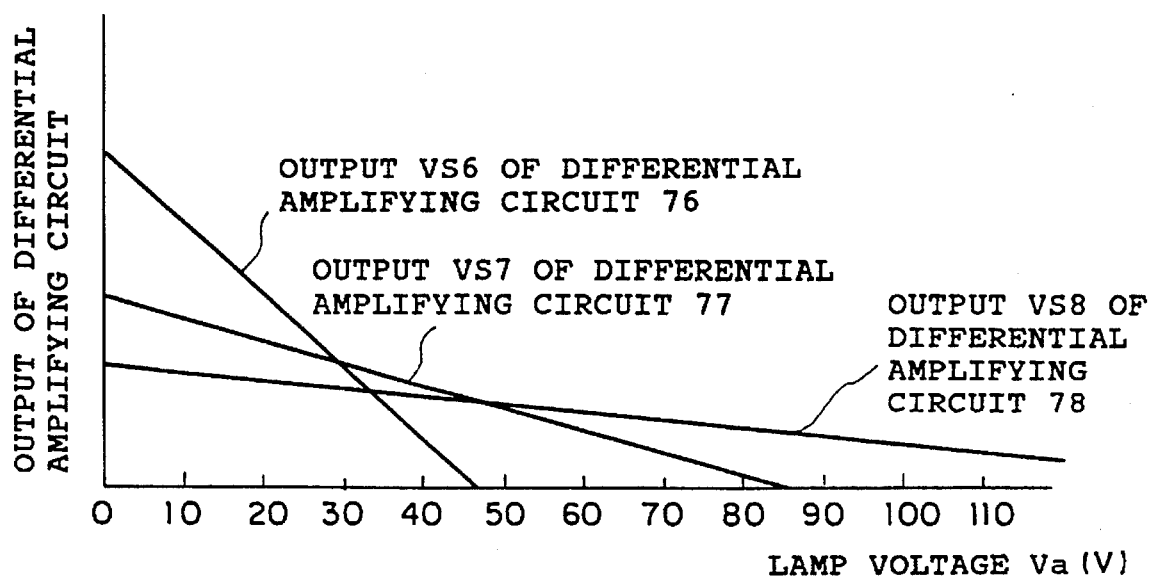
FIG. 25 is a view for describing output voltages produced from differential amplifying circuits employed in the lamp current controlling circuit shown in FIG. 24.

Here, the input-output characteristics of the respective differential amplifying circuits 76 through 78 can be freely varied by changing the resistance values of the respective resistors of the differential amplifying circuits 76 through 78. The input-output characteristics of the differential amplifying circuits 76 through 78 is shown in FIG. 25 as an illustrative example.

Outputs produced from these differential amplifying circuits 76 through 78 are input to the adder circuit 79. The adder circuit 79 outputs the sum of the input signals therefrom. If the output produced from the adder circuit 79 is represented as Vad, then the output Vad={1+ (R41/R42)}{R39 R40 VS4+R38 R40 VS5+R38 R39 VS6)/(R38

Figure 26:
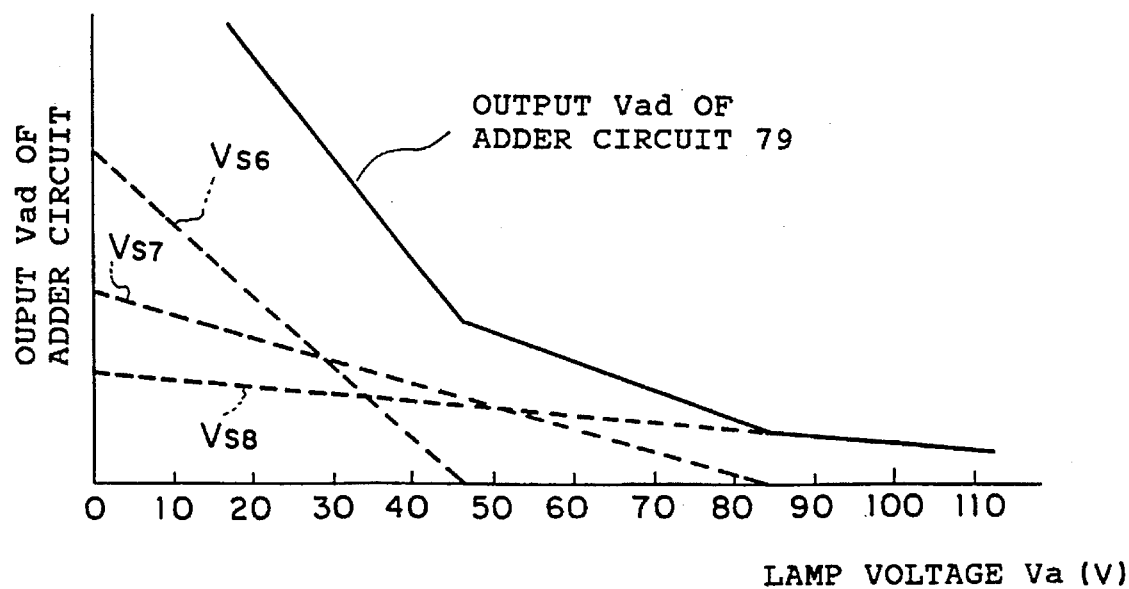
FIG. 26 is a view for describing output voltages of an adder circuit employed in the lamp current controlling circuit shown in FIG. 24.

R39+ R39 R40+R38 R40)}. If R38=R39=R40 and R41=2× R42, then the Vad=VS6+VS7+VS8. In this case, the output of the adder circuit 79 is represented as shown in FIG. 26.

The output of the adder circuit 79 is input to the clipping circuit 80 and is thereafter limited by vCP= {R44/(R43+ R44)}VREF corresponding to an input applied to a non-inversion terminal of the OP amp OP12. Incidentally, the resistor R45 is a current-limiting resistor for preventing excessive current from flowing in the OP amp OP13 through the diode D5.

An output voltage VOUT of the lamp current controlling circuit 7B indicates current to flow in the discharge lamp at the desired lamp voltage Va as described in the first embodiment. The value of the current, which corresponds to the value of the lamp voltage, is equal to that of current corresponding to the voltage developed across the current detector circuit 5 and input to the input terminal 4c of the step-up controlling circuit 4.

When the current to flow in the discharge lamp at the time that the voltage developed across the current detector circuit 5 is 1 V, is 1 A, for example, the output voltage VOUT= 1 V of the lamp current controlling circuit 7B also means an indicated current of 1 A.

When the lamp voltage is less than a voltage at a point Vp2, the output voltage VOUT of the lamp current controlling circuit 7B is represented as a characteristic of a straight line v1 indicative of vS={R44/(R43+R44)}VREF. On the other hand, when the lamp voltage is more than or equal to the voltage at the point Vp2, the output voltage VOUT of the lamp current controlling circuit 7B is represented as characteristics of straight lines v2, v3 and v4 indicative of vS={R29/(R28+R29)}{1+(R27/R26)}VREF−(R27/R26){R2/(R1 +R2)}Va+{R33/(R32+R33)}{1+(R31/R30)}VREF−(R31/R30){R2/(R1+R2)}Va+{R37/(R36+R37)}{1+ (R35/R34)}VREF−(R35/R34){R2/(R1+R2)}Va.

Figure 27:
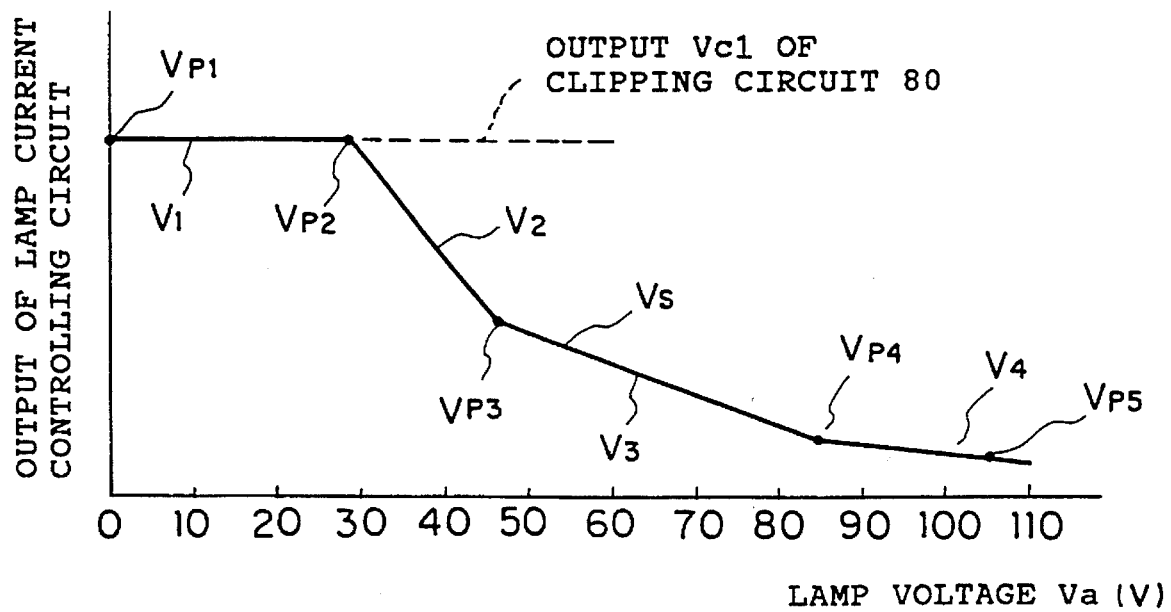
FIG. 27 is a view for explaining an output voltage produced from the lamp current controlling circuit shown in FIG. 24.

Here, a point Vp1, the point Vp2 and Vp3 through Vp5 respectively correspond to the points ip1 through ip5 shown in FIG. 14 in a manner similar to the second embodiment. Further, the straight lines vS and v1 through v4 respectively correspond to the straight lines iS and i1 through i4. Accordingly, a lamp current control characteristic shown in FIG. 27 can be realized by such a circuit configuration.

Further, a plurality of lamp current control characteristics can be obtained by replacing the configuration of the differential amplifying circuit 77 with the circuit configuration (which is different in circuit constant from the former configuration) shown in FIG. 22.

Fourth embodiment

Figure 28:
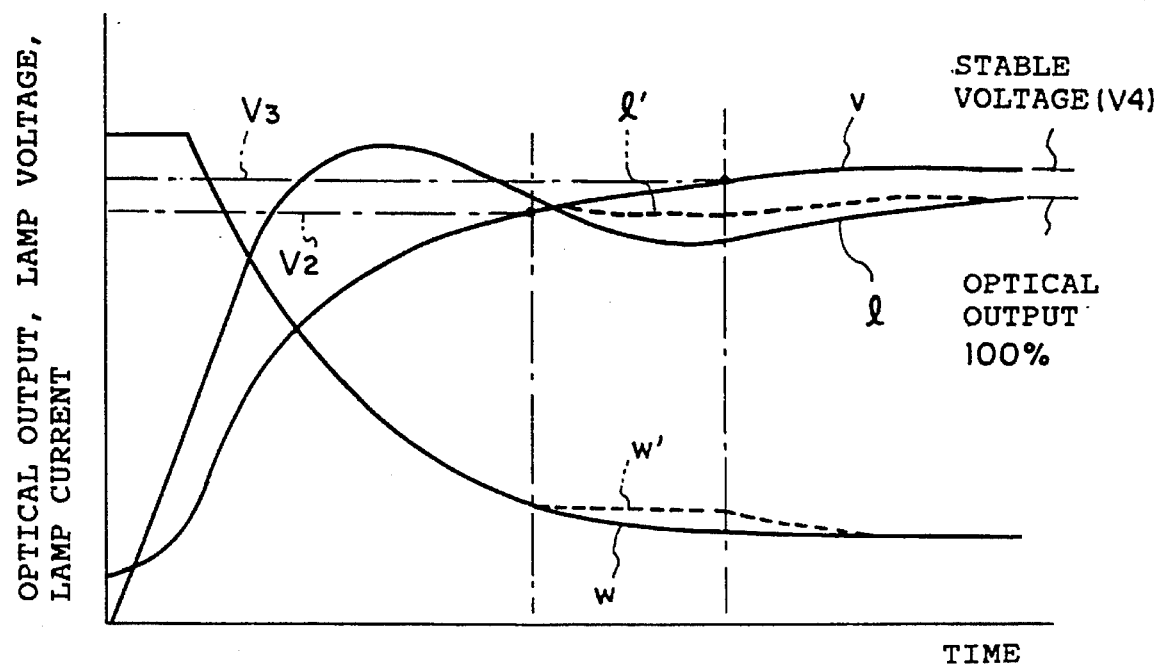
FIG. 28 is a view for describing a relationship among an optical output, a lamp voltage and a lamp current at the time that a device for lighting a discharge lamp, according to a fourth embodiment of the present invention is used.

The fourth embodiment of the present invention will next be described. FIG. 28 is a view for describing a relationship among a lamp voltage, a lamp current and an optical output with respect to the time which elapses since the beginning of lighting. A solid line v represents a lamp voltage rise characteristic of a discharge lamp 12, a solid line w indicates a lamp current which flows in the discharge lamp 12 in accordance with a conventional lamp current control characteristic, and a solid line l denotes a quantity-of-light rise characteristic of a conventional discharge lamp.

Figure 29:
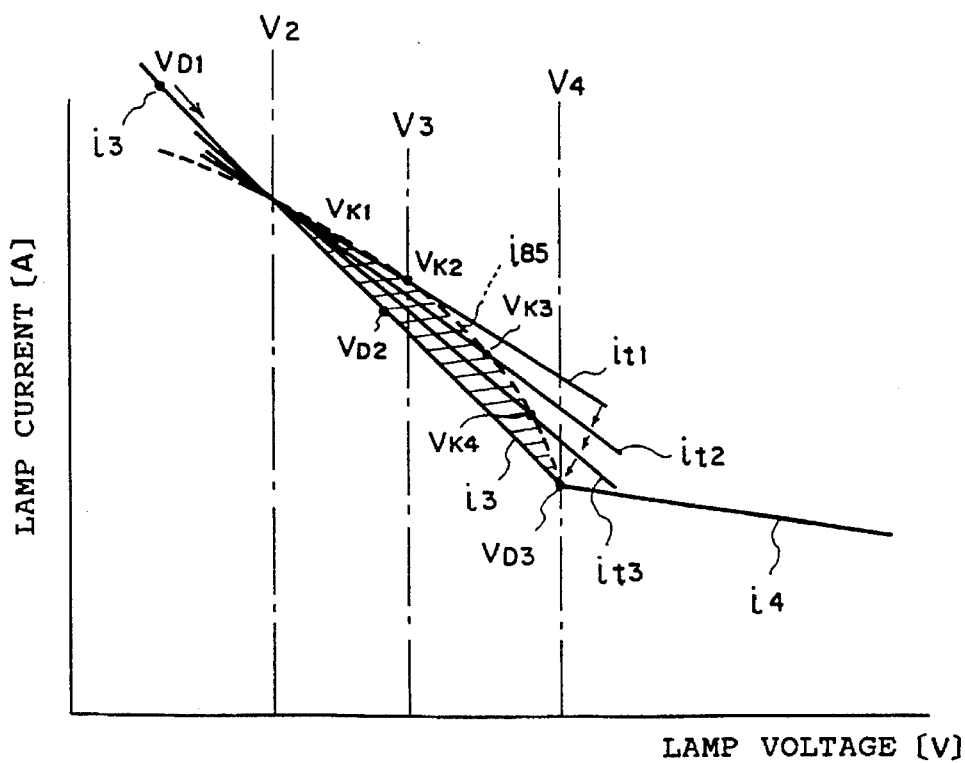
FIG. 29 is a view for describing lamp current control characteristics obtained by the lighting device shown in FIG. 28.

A dotted line w' indicates a lamp current which flows in accordance with a lamp current control characteristic employed in the present embodiment. A dotted line l' represents a quantity-of-light rise characteristic of a discharge lamp, which is employed in this invention. Further, a dashed line V2 indicates a first predetermined lamp voltage and a dashed line V3 indicates a second predetermined lamp voltage. FIG. 29 is an enlarged view of lamp current control characteristics produced in the vicinity of stationary lamp voltages.

When the discharge lamp 12 lights up, the lamp voltage rises as indicated by the solid line v in FIG. 28 from a lower voltage at the beginning of lighting and reaches a stationary lamp voltage V4 (supposed to be 85 V in the present invention).

A lamp current controlling circuit varies the lamp current in accordance with the solid line w so as to correspond to such a variation in the lamp voltage. That is, a control operating point vD1 travels from left to right (toward the stationary lamp voltage V4) along the lamp current control characteristic as shown in FIG. 29.

When the lamp voltage rises, the operating point is fixed to the stationary lamp voltage V4 while changing like vD1 vD2 vD3 along a lamp current control characteristic i3. Since, however, the optimum current control characteristic of the discharge lamp 12 is represented as i85 in which the luminous efficiency indicated by a dotted line has been taken into consideration, shortage in current (power) is developed at a region (corresponding to a portion indicated by oblique lines, which falls within a range between the lamp voltages V2 and V4) defined by the dotted line i85 and the conventional lamp current control characteristic i3.

As shown in FIG. 29, this influence is exerted on the quantity-of-light rise characteristic 1 of the conventional discharge lamp as an undershoot within a range in which the lamp voltage v changes from V2 to V4.

A lighting device according to the present embodiment is used to realize a quantity-of-light rise characteristic capable of reducing the quantity of undershoots, lowering a difference between the quantity of undershoots and that of overshoots and reducing a feeling of physical disorder caused by the undershoots and overshoots.

Figure 30:
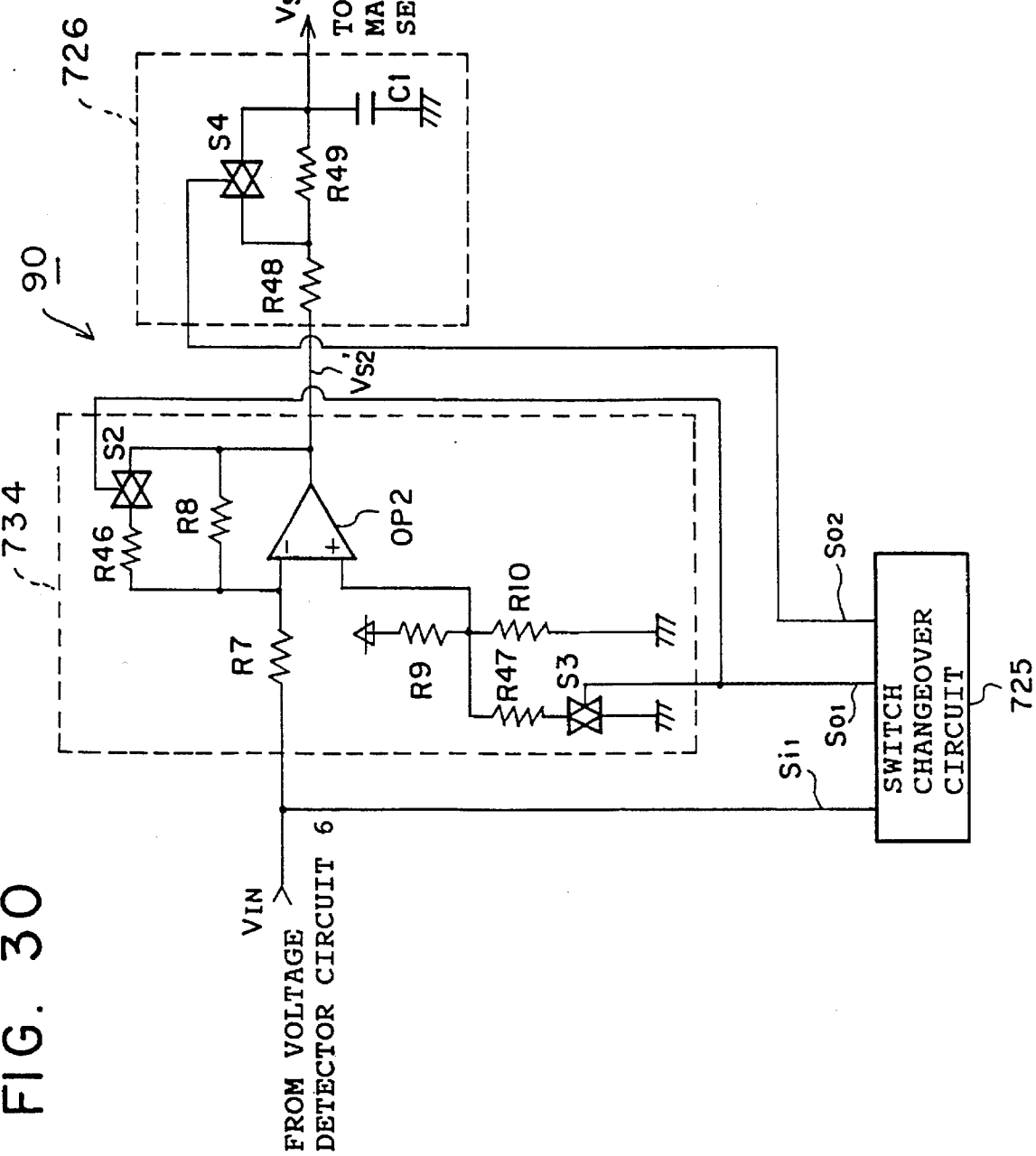
FIG. 30 is a circuit diagram showing a configuration of a differential amplifying circuit for controlling an undershoot.

A method of realizing such a characteristic will hereinafter be described in detail. FIG. 30 is a view illustrating a configuration of a differential amplifying circuit 90 of a lamp current controlling circuit employed in the present embodiment. The differential amplifying circuit 90 serves as an undershoot restraining or controlling means. A description will now be made of only such a single lamp current control characteristic as shown in FIG. 14 in the second embodiment for the sake of simplification of description. However, a circuit similar to the differential amplifying circuit 72a shown in FIG. 22 for realizing the plurality of control characteristics, which have been employed in the second embodiment, can be realized.

The differential amplifying circuit 90 receives a voltage VIN equivalent to a lamp voltage output from a voltage detector circuit 6 therein and supplies an output to the terminal m2 of the maximum value selecting circuit 74 shown in FIG. 15. The output of the voltage detector circuit 6 is supplied to an inversion input terminal of an OP amp OP2 through a resistor R7 and input to a switch changeover circuit 725 having one input terminal Si1 and two output terminals S01 and S02.

The inversion input terminal of the OP amp OP2 is electrically connected to an output terminal thereof through a resistor R8. Further, the inversion input terminal thereof is electrically coupled to one of terminals of a switch S2 through a resistor R46. The other terminal of the switch S2 is electrically connected to the output terminal of the OP amp OP2.

A non-inversion input terminal of the OP amp OP2 is electrically connected to a voltage dividing point provided between resistors R9 and R10 electrically series-connected between a reference power supply VREF and a GND. Further, the non-inversion input terminal thereof is also electrically connected to one of terminals of a switch S3 through a resistor R47. The other terminal of the switch S3 is connected to the GND. The switches S2 and S3 are respectively provided with terminals for opening and closing these switches. These terminals are connected to one another and connected to the output terminal S01 of the switch changeover circuit 725.

An output produced from the OP amp OP2 is used as an output VS2' of a differential amplifying unit 734 and is input to a time-constant switching unit 726. The output terminal of the OP amp OP2 is electrically connected to a resistor R49 through a resistor R48 of the time-constant switching unit 726 so as to serve as the output of the differential amplifying circuit 90.

One of terminals of a switch S4 is electrically connected to a junction point or node between the resistors R48 and R49, whereas the other terminal thereof is electrically coupled to the GND through a capacitor C1 connected to the output of the differential amplifying circuit 90. The switch S4 is provided with a terminal for opening and closing the switch S4, which is in turn connected to the output terminal S02 of the switch changeover circuit 725.

When the output VIN of the voltage detector circuit 6 is less than or equal to the first predetermined lamp voltage (e.g., a stationary lamp voltage of −10 V), the switch changeover circuit 725 outputs a signal for opening each of the switches S2 and S3 therefrom. When the output VIN is more than or equal to the first predetermined lamp voltage and less than the second predetermined lamp voltage (e.g., a stationary lamp voltage of −5 V), the switch changeover circuit 725 outputs a signal for closing each of the switches S2 and S3 therefrom.

Further, when the output VIN is less than the second predetermined lamp voltage, the switch changeover circuit 725 outputs a signal for closing the switch S4 therefrom. When the output VIN is more than or equal to the second predetermined lamp voltage, the switch changeover circuit 725 outputs a signal for opening the switch S4 therefrom. The relationship between the first and second predetermined lamp voltages is represented as the first predetermined voltage<the second predetermined voltage. Both the first and second predetermined voltages fall within the lamp-voltage range between the points ip3 and ip4 on the lamp current control characteristic shown in FIG. 14.

The resistor R48 of the time-constant switching unit 726 is a very small resistor and is used to limit the flow of current into the capacitor C1 in a state of the switch S4 being closed. The time constant of the capacitor C1 and the resistor R48 is so low.

On the other hand, the resistor R49 is a large resistor. The relationship between the resistors R48 and R49 is represented as R48<<R49. The time constant produced by the resistor R49 and the capacitor C1 is large in an open state of the switch S4.

Operation of the differential amplifying circuit 90 will next be described below. When the lamp voltage is less than the first predetermined lamp voltage v2, the switches S2 and S3 are opened. Therefore, the control operating point vD1 exists on the straight line i3 related to the lamp current control characteristic. Further, the current is supplied to the discharge lamp 12 in accordance with i3= {R10/(R9+ R10)}{1+(R8/R7)}VREF−(R8/R7){R2/(R1+R2)}Va.

Incidentally, the switch S4 of the time-constant switching unit 726 is closed to form a time-constant circuit comprised of the resistor R48 and the capacitor C1. Since, however, the time constant is so low as described above, the influence exerted on the time-constant switching unit 726 is negligible.

Next, when the lamp voltage reaches the first predetermined lamp voltage v2, the switch changeover circuit 725 closes the switches S2 and S3. Since the resistor R46 is parallel-connected to the resistor R8, the gain of the differential amplifying unit 734 is reduced. Further, since the resistor R47 is parallel-connected to the resistor R10, the offset thereof is reduced.

Accordingly, the lamp current control characteristic varies like the it1 as shown in FIG. 29 and the control operating point moves from vD1 to vk1. Here, the it1 is equal to {R10 R47/(R10+R47)}/[R9+{R10 R47/(R10+R47)}]{1+R8 R46)/R7(R8+R46)}VREF−{R8 R46/R7(R8+R46)}{R1/(R1+R29)}Va.

When the lamp voltage reaches the second predetermined lamp voltage, the switch changeover circuit 725 opens the switches S2 and S3 and the switch S4 of the time-constant switching unit 726. Thus, an input-output characteristic of the differential amplifying unit 734 is changed to the original input-output characteristic again and an input-output characteristic of the time-constant switching unit 726 varies in accordance with a time constant (R48+R49)C1≈R49×C1.

That is, the input-output characteristic of the differential amplifying unit 734 changes from it1 to i3 at the voltage V2 corresponding to a boundary line. However, an input-output characteristic of the differential amplifying circuit 90, i.e., the lamp current control characteristic gently changes in order of it1, it2, it3 and i3 in accordance with the time constant of the time-constant switching unit 726. Further, the control operating point is also moved in order of vk2, vk3, vk4 and vD3. Although a description has been made in such a manner that the input-output characteristic varies in a stepwise manner for convenience, it continuously varies from it1 to i3 in practice. Further, vD3 corresponds to a point of two coordinate points, at which the lamp voltage is lower than that at the other coordinate point.

Accordingly, an actual lamp current control characteristic does not extend over the portion indicated by the oblique lines in FIG. 29, which corresponds to a power-shortage region. As a result, the lamp current, which flows during a period in which the lamp voltage changes from v2 to V4, is represented as indicated by the dotted line w' in FIG. 28. Further, the quantity-of-light rise characteristic also changes from the conventional solid line to the dotted line 1'. By using the above described invention, it is therefore possible to reduce quantity-of-light undershoots.

Having now fully described the invention, it will be apparent to those skilled in the art that many changes and modifications can be made without departing from the spirit or scope of the invention as set forth herein.

What is claimed is:

1. A discharge lamp lighting device, comprising:

voltage applying means for applying an alternating voltage to a discharge lamp;

discharge starting means for applying a high voltage to the discharge lamp to start the discharge lamp;

voltage detecting means for detecting the voltage applied across the discharge lamp;

current detecting means for detecting a current supplied to the discharge lamp; and a lamp current controller including means for deciding a value of current to be supplied to the discharge lamp based on the luminous efficiency of the discharge lamp and the voltage detected by said voltage detecting means, said luminous efficiency depending on the voltage applied across the discharge lamp, and means for controlling a voltage output from said voltage applying means such that said decided value of current coincides with the value of current detected by said current detecting means.

2. The device according to claim 1, wherein said lamp current controller decides the value of the current such that the quantity of light emitted from the discharge lamp is held substantially constant.

3. The device according to claim 2, wherein said lamp current controller further comprises means for storing a lamp current control characteristic that indicates respective current values corresponding to respective voltage values, means for holding said quantity of light substantially constant and means for deciding a current value based on said lamp current control characteristic and the voltage detected by said voltage detecting means.

4. The device according to claim 3, wherein said means for storing a lamp current control characteristic stores a plurality of lamp current control characteristics different from each other and wherein said means for deciding selects a lamp current control characteristic corresponding to a lamp voltage from said plurality of lamp current control characteristics when said lighting device is in a steady state.

5. The device according to claim 4, wherein when said lamp voltage is unknown, said means for deciding selects a lamp current control characteristic that minimizes power to be supplied to the discharge lamp.

6. The device according to claim 3, wherein when the voltage detected by said voltage detecting means is reduced, said lamp current controller selects a lamp current control characteristic that minimizes power to be supplied to the discharge lamp.

7. The device according to claim 3, wherein said lamp current controller includes stationary lamp voltage storing means for receiving the value of said lamp voltage from said voltage detecting means at regular intervals and for updating the stored contents based on the input value of lamp voltage.

8. The device according to claim 7, wherein said stationary lamp voltage storing means stops updating the contents of said stationary lamp voltage storing means for a predetermined period when the input value of lamp voltage is smaller than the value stored therein.

9. The device according to claim 3, wherein said lamp current controlling means includes undershoot restraining means for restraining light emission undershoot.

10. The device according to claim 1, wherein said lamp current controller further comprises pulse width modulation control means for controlling a duty cycle of the AC voltage applied to the discharge lamp.

11. The device according to claim 2, wherein said lamp current controller determines a lamp current control characteristic based on luminous efficiency of the lamp such that the luminous flux output from the lamp is substantially constant over an entire operating range of the lamp.

12. The device according to claim 3, wherein said stored lamp current control characteristic has a piece-wise linear shape substantially as shown in FIG. 9.

13. The device according to claim 3, wherein said stored lamp current control characteristic has a piece-wise linear shape substantially as shown in FIG. 14.

14. The device according to claim 4, wherein said stored lamp current control characteristics have piece-wise linear shapes substantially as shown in FIG. 13.

15. The device according to claim 4, wherein said stored lamp current control characteristics have piece-wise linear shapes substantially as shown in FIG. 21.

16. A discharge lamp circuit which maintains lamp output substantially constant comprising:

a current applying circuit applying alternating current to a discharge lamp, a voltage detector detecting voltage across the discharge lamp, a control circuit controlling said current applying circuit in response to said voltage detector to maintain discharge lamp output substantially constant by utilizing a lamp current control characteristic.

17. The circuit according to claim 16, wherein said current applying circuit comprises:

a DC voltage supply and a step-up circuit stepping-up the DC voltage from said DC voltage supply, converting the DC voltage to AC voltage and applying the AC voltage to a discharge lamp.

18. The circuit according to claim 16 further comprising a lamp current control characteristic generator.

19. The circuit according to claim 18, wherein said lamp current control characteristic generator further comprises:

a plurality of differential amplifiers each having different, substantially linear output responses, a maximum voltage value selector which selects the maximum voltage value output from said plurality of differential amplifiers and a clipper circuit which clips the voltage output from said maximum voltage value selector to generate a clipped output voltage, wherein the clipped output voltage is used by said control circuit to control said step-up circuit.

20. The circuit according to claim 18, wherein said lamp current control characteristic generator further comprises:

a timer responsive to a starting condition of a discharge lamp, a lamp voltage storage unit responsive to said timer for periodically storing the voltage value across the discharge lamp detected by said voltage detector, a differential amplifier circuit including, a first switch capable of selecting one of a plurality of first resistors wherein the selected resistor is connected between an output and an inverting input of a differential amplifier, a second switch capable of selecting one of a plurality of second resistors wherein the selected resistor is connected between an output and a noninverting input of said differential amplifier and a switch controlling circuit controlling said first and second switches in response to the voltage value stored by said lamp voltage storage unit and a clipper circuit which clips the voltage output from said differential amplifier circuit to generate a clipped output voltage, wherein said clipped output voltage is used by said control circuit to control said step-up circuit.

21. The circuit of claim 20, wherein said lamp voltage storage unit stores a minimum voltage value when the discharge lamp is lit for the first time.

22. The circuit of claim 20, wherein when the value of the lamp voltage input from said voltage detector falls below the value stored in said lamp voltage storage unit, said switch controlling unit controls said first and second switches to provide a minimum power control characteristic to said control circuit and said lamp voltage storage unit suppresses storing the voltage value detected by said voltage detector until a predetermined time interval has elapsed.

23. The circuit according to claim 18, wherein said lamp current control characteristic generator further comprises:

a plurality of differential amplifiers each having different, substantially linear output responses, an adder circuit adding voltages output from said plurality of differential amplifiers, a clipper circuit which clips the voltage output from said adder circuit to generate a clipped output voltage and wherein the clipped output voltage is used by said control circuit to control said current applying circuit.

24. The circuit of claim 19, further comprising:

a time constant circuit receiving voltage from one of said plurality of differential amplifiers and outputting a voltage to said maximum voltage value selector, a plurality of switches which change a value of the time constant in said time constant circuit, a switch controlling circuit outputting switch control signals to said plurality of switches.

25. The circuit of claim 20, further comprising:

a time constant circuit receiving voltage from said differential amplifier circuit and outputting a voltage to said clipper circuit, a plurality of switches which change a value of the time constant in said time constant circuit, a switch controlling circuit outputting switch control signals to said plurality of switches.

26. A method for maintaining discharge lamp output substantially constant comprising the steps of:

applying alternating current to a discharge lamp, detecting voltage across the discharge lamp, controlling the current applied to the discharge lamp in response to the detected voltage to maintain discharge lamp output substantially constant by utilizing a lamp current control characteristic.

27. The method according to claim 26 further comprising the step of generating a lamp current control characteristic.

28. The method according to claim 27, wherein said step of generating a lamp current control characteristic further comprises the steps of:

generating a plurality of different, substantially linear voltages, selecting a maximum voltage from said plurality of different, substantially linear voltages and clipping the selected, maximum voltage, wherein said controlling step utilizes the clipped voltage to control the current applied to the discharge lamp.

29. The method according to claim 27, wherein said step of generating a lamp current control characteristic further comprises the steps of:

periodically storing the detected voltage across the discharge lamp, storing a plurality of lamp current control characteristics, selecting one of the plurality of stored lamp current control characteristics in response to the step of periodically storing the detected voltage, clipping the selected lamp current control characteristic, wherein said controlling step utilizes the clipped voltage to control the current applied to the discharge lamp.

30. The method of claim 29, wherein said step of periodically storing the detected voltage stores a minimum voltage value when the discharge lamp is lit for the first time.

31. The method circuit of claim 29, wherein when the value of the detected lamp voltage falls below the value stored in said periodic storing step, said selecting step selects a minimum power control characteristic and said periodic storing step stops storing the detected voltage value until a predetermined time interval has elapsed.

32. The method according to claim 27, wherein said step of generating a lamp current control characteristic further comprises the steps of:

generating a plurality of different, substantially linear voltages, adding the generated voltages, clipping the added voltages, wherein said controlling step utilizes the clipped voltage to control the current applied to the discharge lamp.

33. The method of claim 28 further comprising the step of reducing a light emission undershoot of the discharge lamp.

34. The method of claim 29 further comprising the step of reducing a light emission undershoot of the discharge lamp.

* * * * *